United States Patent
Shevade et al.

(10) Patent No.: US 11,985,065 B2
(45) Date of Patent: *May 14, 2024

(54) ENABLING ISOLATED VIRTUAL NETWORK CONFIGURATION OPTIONS FOR NETWORK FUNCTION ACCELERATORS

(71) Applicant: Amazon Technologies, Inc., Seattle, WA (US)

(72) Inventors: Upendra Bhalchandra Shevade, Washington, DC (US); Ximeng Simon Yang, San Francisco, CA (US); Benjamin Wojtowicz, San Francisco, CA (US); Diwakar Gupta, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,344

(22) Filed: Jun. 16, 2022

(65) Prior Publication Data

US 2023/0412507 A1 Dec. 21, 2023

(51) Int. Cl.
*H04L 45/76* (2022.01)
*G06F 9/54* (2006.01)
*H04L 9/40* (2022.01)
*H04L 12/46* (2006.01)
*H04L 47/12* (2022.01)

(52) U.S. Cl.
CPC .............. *H04L 45/76* (2022.05); *G06F 9/547* (2013.01); *H04L 12/4641* (2013.01); *H04L 47/12* (2013.01); *H04L 63/126* (2013.01)

(58) Field of Classification Search
CPC ...... H04L 45/76; H04L 12/4641; H04L 47/12; H04L 63/126; G06F 9/547
See application file for complete search history.

(56) References Cited

U.S. PATENT DOCUMENTS

| | | | |
|---|---|---|---|
| 8,539,079 B2 | 9/2013 | Thireault | |
| 9,092,269 B2 * | 7/2015 | Kandula | ............. H04L 41/0893 |
| 9,125,047 B2 | 9/2015 | Sundaresan et al. | |
| 9,529,620 B1 * | 12/2016 | Dow | ................... G06F 9/45558 |
| 9,703,660 B2 | 7/2017 | Cillis et al. | |
| 9,838,268 B1 | 12/2017 | Mattson | |
| 9,876,851 B2 | 1/2018 | Chandramouli et al. | |

(Continued)

FOREIGN PATENT DOCUMENTS

WO 2014073949 A1 5/2014

OTHER PUBLICATIONS

U.S. Appl. No. 17/710,571, filed Mar. 31, 2022, Manjari Asawa.

(Continued)

*Primary Examiner* — Ramy M Osman
(74) *Attorney, Agent, or Firm* — Robert C. Kowert; Kowert, Hood, Munyon, Rankin & Goetzel, P.C.

(57) ABSTRACT

A first security rule set for traffic of a compute instance run at a virtualization server is stored in response to a programmatic request. A second security rule set for traffic of a network function accelerator of the virtualization server is stored in response to another programmatic request. Prior to delivery of network messages to the compute instance or from the accelerator, compliance with the applicable security rule set is verified.

20 Claims, 17 Drawing Sheets

(56) References Cited

U.S. PATENT DOCUMENTS

| | | | |
|---|---|---|---|
| 10,064,242 B2 | 8/2018 | Pawar et al. | |
| 10,135,702 B2 | 11/2018 | Lahiri | |
| 10,244,507 B2 | 3/2019 | Tarlazzi et al. | |
| 10,257,105 B2 | 4/2019 | Majmundar et al. | |
| 10,419,550 B2 | 9/2019 | Nainar et al. | |
| 10,581,717 B2 | 3/2020 | Tejaprakash et al. | |
| 10,594,456 B2 | 3/2020 | Park et al. | |
| 10,608,734 B2 | 3/2020 | Barbieri et al. | |
| 10,705,808 B2 | 7/2020 | Chiosi et al. | |
| 10,749,721 B2 | 8/2020 | Fertonani et al. | |
| 10,750,514 B2 | 8/2020 | Fujinami | |
| 10,817,409 B2 | 10/2020 | Zeng et al. | |
| 10,880,173 B2 | 12/2020 | Seenappa et al. | |
| 10,891,140 B1 | 1/2021 | Levin | |
| 10,944,668 B2 | 3/2021 | Rajagopal | |
| 10,959,098 B2 | 3/2021 | Cidon et al. | |
| 10,999,783 B2 | 5/2021 | Pateromichelakis | |
| 11,159,344 B1* | 10/2021 | Shevade | G06F 9/5077 |
| 11,190,413 B1 | 11/2021 | Priya et al. | |
| 11,336,721 B2* | 5/2022 | Parulkar | H04L 67/1085 |
| 11,356,500 B1 | 6/2022 | Gupta et al. | |
| 11,539,582 B1 | 12/2022 | Gupta et al. | |
| 11,552,842 B2 | 1/2023 | Barabell | |
| 2012/0127151 A1 | 5/2012 | Murakami | |
| 2013/0343399 A1* | 12/2013 | Kandula | H04L 41/0893 |
| | | | 370/412 |
| 2014/0189686 A1* | 7/2014 | Masters | H04L 67/1031 |
| | | | 718/1 |
| 2014/0351811 A1* | 11/2014 | Kruglick | G06F 9/45558 |
| | | | 718/1 |
| 2016/0165481 A1* | 6/2016 | Jin | H04W 28/0263 |
| | | | 370/236 |
| 2016/0344611 A1* | 11/2016 | Más Ivars | H04L 45/38 |
| 2017/0118102 A1* | 4/2017 | Majumder | H04L 43/20 |
| 2017/0331680 A1* | 11/2017 | Ji | H04L 12/4641 |
| 2018/0146375 A1 | 5/2018 | Pawar et al. | |
| 2018/0365635 A1 | 12/2018 | Lucrecio et al. | |
| 2019/0042326 A1 | 2/2019 | Chilikin | |
| 2019/0158606 A1 | 5/2019 | Guim Bernat et al. | |
| 2019/0165906 A1 | 5/2019 | Bala et al. | |
| 2019/0190785 A1 | 6/2019 | Power | |
| 2019/0213029 A1 | 7/2019 | Liu et al. | |
| 2019/0289497 A1 | 9/2019 | Rajagopal | |
| 2019/0342161 A1* | 11/2019 | Brandwine | H04L 41/0816 |
| 2019/0391855 A1 | 12/2019 | Guim Bernat et al. | |
| 2019/0394826 A1 | 12/2019 | Wang et al. | |
| 2020/0084110 A1* | 3/2020 | Kim | H04L 41/0894 |
| 2020/0245229 A1 | 7/2020 | Horn et al. | |
| 2021/0006944 A1 | 1/2021 | Raghothaman et al. | |
| 2021/0073047 A1 | 3/2021 | Bhandaru | |
| 2021/0089239 A1* | 3/2021 | Liguori | H04L 67/1097 |
| 2021/0144517 A1 | 5/2021 | Guim Bernat et al. | |
| 2021/0144555 A1 | 5/2021 | Kim et al. | |
| 2021/0243770 A1 | 8/2021 | Roessler | |
| 2021/0271517 A1 | 9/2021 | Guim Bernat | |
| 2021/0279161 A1 | 9/2021 | Tameshige | |
| 2022/0021605 A1* | 1/2022 | Bagwell | H04L 45/30 |
| 2022/0030117 A1 | 1/2022 | Young et al. | |
| 2022/0046084 A1 | 2/2022 | Nair | |
| 2022/0070734 A1 | 3/2022 | Rajagopal | |
| 2022/0345361 A1* | 10/2022 | Yang | H04L 45/026 |
| 2022/0377615 A1 | 11/2022 | Radunovic | |
| 2022/0405114 A1* | 12/2022 | Chen | G06F 9/5016 |
| 2023/0054537 A1* | 2/2023 | De Vito | H04L 41/5058 |
| 2023/0412507 A1* | 12/2023 | Shevade | H04L 63/126 |

OTHER PUBLICATIONS

U.S. Appl. No. 17/548,391, filed Dec. 10, 2021, Ammar Latif.
U.S. Appl. No. 17/364,791, filed Jun. 30, 2021, Diwakar Gupta.
U.S. Appl. No. 17/364,788, filed Jun. 30, 2021, Diwakar Gupta.
U.S. Appl. No. 17/364,779, filed Jun. 30, 2021, Diwakar Gupta.
U.S. Appl. No. 17/326,218, filed May 20, 2021, Ximeng Simon Yang.
U.S. Appl. No. 17/326,221, filed May 20, 2021, Ximeng Simon Yang.
U.S. Appl. No. 17/461,785, filed Aug. 30, 2021, Diwakar Gupta.
U.S. Appl. No. 17/806,684, filed Jun. 13, 2022, Benjamin Wojtowicz.
U.S. Appl. No. 17/806,685, filed Jun. 13, 2022, Benjamin Wojtowicz.
U.S. Appl. No. 17/807,341, filed Jun. 16, 2022, Upendra Bhalchandra Shevade et al.
U.S. Appl. No. 17/807,343, filed Jun. 16, 2022, Upendra Bhalchandra Shevade et al.
Ashfaq Ahmed, et al., "Hybrid Automatic Repeat Request (HARQ) in Wireless Communication Systems and Standards: A Contemporary Survey", IEEE Communications Surveys & Tutorials 23.4, 2021, pp. 2711-2752.
Unknown, "5G; NG-RAN; Architecture Description", Technical Specification, ETSI TS 138 401, Version 16.8.0, Release 16, Jan. 2022, pp. 1-82.
U.S. Appl. No. 17/809,864, filed Jun. 29, 2022, Nikolay Kirschenmann, et al.
U.S. Appl. No. 17/810,319, filed Jun. 30, 2022, Julius Mueller, at al.
U.S. Appl. No. 17/808,518, filed Jun. 23, 2022, Ozgur Dural.
U.S. Appl. No. 17/820,542, filed Aug. 17, 2022, Nikolay Kirschenmann, et al.
U.S. Appl. No. 18/146, 126, filed Dec. 23, 2022, Diwakar Gupta.
U.S. Appl. No. 18/067,651, filed Dec. 16, 2022, Frank Paterra.
U.S. Appl. No. 18/067,650, filed Dec. 16, 2022, Jiandong Huang.
U.S. Appl. No. 18/066,943, filed Dec. 15, 2022, Awaiz Ahmad Khan.
U.S. Appl. No. 18/067,654, filed Dec. 16, 2022, Frank Paterra.
Li Xin et al: "QoS-Aware Service Selection in Geographically Distributed Clouds", 2013 22nd International Conference on Computer Communication and Networks (ICCCN), IEEE, Jul. 30, 2013, pp. 1-5 [retrieved on Sep. 27, 2013].

* cited by examiner

ENABLING ISOLATED VIRTUAL NETWORK CONFIGURATION OPTIONS FOR NETWORK FUNCTION ACCELERATORS

BACKGROUND

Several generations of broadband cellular communication technologies have been deployed in recent years. 5G is the fifth-generation technology standard for broadband cellular networks, which is gradually taking the place of the fourth-generation (4G) standard of Long-Term Evolution (LTE). 5G technology offers greatly increased bandwidth, thereby broadening the cellular market beyond smartphones to provide last-mile connectivity to desktops, set-top boxes, laptops, Internet of Things (IoT) devices, and so on. Some 5G cells employ frequency spectrum similar to that of 4G, while other 5G cells may employ frequency spectrum in the millimeter wave band. Cells in the millimeter wave band may have a relatively small coverage area but may offer much higher throughput than 4G. As 5G technology becomes more prevalent, new types of broadband-based applications are likely to be developed and deployed.

Figure 1:
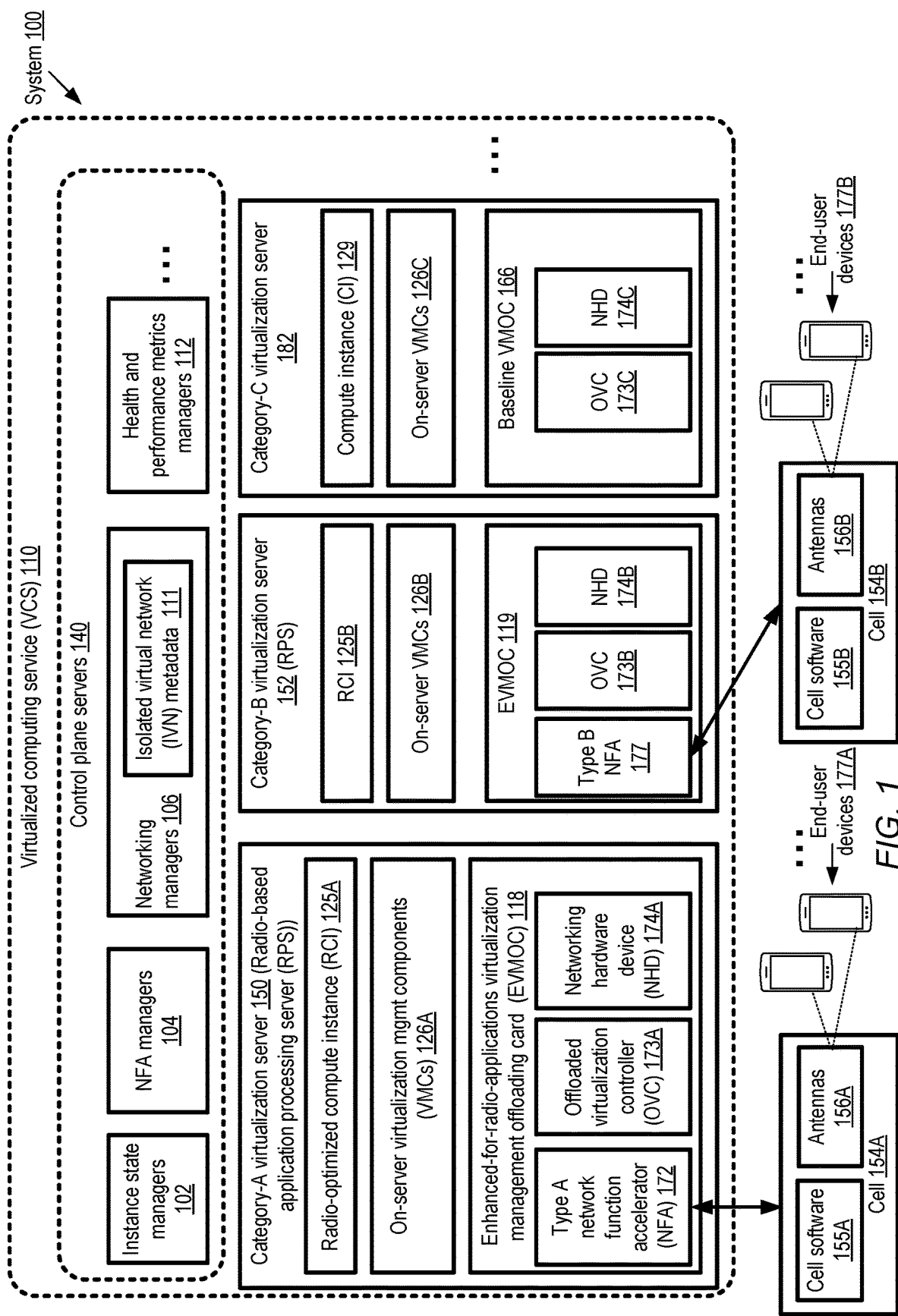
FIG. 1 illustrates an example system environment in which virtualization servers whose virtualization management offloading cards include hardware network function accelerators may be employed for radio-based applications run at least partly using resources of a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the term "set" should generally be interpreted to include one or more described items throughout this application. Accordingly, phrases such as "a set of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

DETAILED DESCRIPTION

The present disclosure relates to methods and apparatus for executing radio-based applications using virtualization servers equipped with offloading cards that include network function accelerator hardware, virtualization management components, as well as networking hardware devices. Such virtualization servers are also referred to as radio-based application processing servers or RPSs. Such RPSs can be managed by a cloud provider in some examples and can be based on server designs used by the cloud provider in its network, whereby a virtualization server includes one or more primary processors that run customer compute instances and an offloading card that runs at least part of a virtualization controller that manages the launch of compute instances on the virtualization server. The network function accelerators ("NFAs") of the RPS can be used to implement part of the functionality of a variety of radio-based or telecommunication applications (e.g., various types of broadband cellular applications such as private 5G (fifth generation) networks, IoT (Internet of Things)-based applications, public 5G applications and the like. In some examples, the NFAs can perform certain L1 (or PHY) functions of the radio access network ("RAN") protocol stack, also referred to as real-time baseband processing. Control plane servers of a virtualized computing service (VCS) can communicate with the virtualization management components on the offloading cards via the networking hardware devices to initiate various types of administrative tasks at the servers, including for example launching or terminating compute instances or virtual machines. The offloading cards can help reduce the workload of the primary processors (e.g., CPUs) of the virtualization servers in at least two ways: by performing some of the virtualization tasks that would otherwise be performed at the primary processors, and by executing at least some network functions of radio-based applications which would also otherwise be performed at the primary processors. Furthermore, the NFAs can execute at least some network functions faster, e.g., using custom chipsets designed specifically for the network functions, than is feasible using the primary processors. For example, an NFA can include a mix of digital signal processors (DSPs) and advanced RISC machine (ARM) cores which are optimized for L1 processing tasks.

The incorporation of NFAs at the virtualization management offloading cards (VMOCs) also enables the control plane servers to perform many of the configuration operations needed to manage the NFAs, such as deploying firmware to the NFAs, assigning networking address that can be used for front-haul and mid-haul traffic of radio-based applications (RBAs) which use the NFAs for network functions, and providing isolated virtual network (IVN) features such as security groups and customizable routing for the NFAs. In contrast to alternative approaches in which NFA cards incorporated into a larger server design can be accessed in an un-virtualized manner from bare-metal compute instances, NFAs incorporated within virtualization management offloading cards (VMOCs) can be presented in virtualized form to multiple compute instances run at the RPSs, thereby simplifying network slicing for RBAs. While the control plane servers are located at data centers of cloud provider networks, the RPS themselves can be located at premises chosen by the RBA owners for example based on proximity to cell towers or antennas, enabling the low latencies required for high-end telecommunication applications such as 5G (fifth generation) applications.

As one skilled in the art will appreciate in light of this disclosure, certain embodiments may be capable of achieving various advantages, including some or all of the following: (a) enabling new radio-based applications to be brought online quickly and maintained using time-tested resource provisioning, scalability and availability techniques of provider networks, (b) reducing the computing, memory, storage resources and electrical power used for radio-based applications, e.g., by intelligently distributing and/or migrating workloads at various granularities across available resources and sharing resources among multiple applications, and/or (c) improving the user experience of administrators of radio-based applications by simplifying the management and administration of the applications using provider network tools and interfaces.

According to some embodiments, a system may comprise a set of one or more control plane servers (CPSs) of a VCS of a cloud provider network, and a virtualization server which includes one or more primary processors (e.g., CPUs) and an offloading card. The offloading card may include (a) a virtualization controller for compute instances launched at the virtualization server (b) at least one NFA for radio-based applications and (c) at least one networking hardware device (NHD). In some implementations, the offloading card may be linked to the primary processors via a peripheral interface such as a Peripheral Component Interface-Express (PCIe) interface, a Universal Serial Bus (USB) interface, or a custom peripheral interface designed by the operator of the provider network. In some embodiments, the offloading card may include one or more memories and one or more processors, with the memory or memory storing instructions that when executed on the processor(s) implement the logic of the virtualization controller, the NFA and communication-related tasks performed using the NHD. For example, the instructions of the offloading card memory, when executed at the processor(s) of the offloading card, may cause messages to be transmitted using the NHD, or process contents of messages received via the NHD.

As part of their administrative responsibilities, a set of CPSs may assign several network addresses for use by components of the virtualization server. For example, a network address within a substrate network (an underlying physical network on top of which virtual networks can be configured) of the VCS may be assigned to the NHD. The substrate network may be used for communication with resources of the cloud provider network that are external to the virtualization server. The set of CPSs may also assign a second network address to a compute instance which is launched, with the help of the virtualization controller, at the virtualization server. The second network address may not be part of the substrate network, but may instead be selected from a range of addresses of an isolated virtual network (IVN) or virtual private cloud (VPC) in some embodiments. In various embodiments, to assign the second network address to the compute instance, a virtual network interface (VNI) managed by the set of CPSs may be programmatically attached to the compute instance, and the second network address may be assigned to the VNI. Furthermore, the set of CPSs may also assign, to the NFA, a third network address to be used for communications between the NFA and one or more radio units (RUs) of radio-based applications (RBAs) in some embodiments. The virtualization server may store instructions that when executed on a primary processor of the virtualization server cause a first network function of an RBA to be executed at the compute instance in response to a message which is received at the compute instance (e.g., from an RBA component running at some other compute instance at another virtualization server). The message may be received using a mapping between the network address assigned to the compute instance and the substrate network address in some embodiments. Such mappings may be employed as part of an encapsulation protocol used at the VCS for translations between physical addresses of the substrate network and the addresses assigned to compute instances within virtualized networks. Based at least in part on a result of the first network function, a second network function of the RBA may be executed at the NFA in at least one embodiment. Output of the second network function may be transmitted to an RU of the RBA using the third network address assigned by the CPS as a source address. Note that in some embodiments a single network address assigned to a particular NHD at on offloading card may be used for several different types of traffic, including for example front-haul traffic and mid-haul traffic of an RBA. In one implementation, an NHD may have several network ports, and respective ports may be used for the different kinds of traffic.

A network function is a functional building block within a network infrastructure, which has well-defined external interfaces and a well-defined functional behavior. Network functions can be chained together to form communications services. Network functions have historically been implemented as a physical network appliance or node; however network functions can be virtualized as well. The core and RAN (radio access network) network functions referenced herein can be based at least partly on the 3rd Generation Partnership Project (3GPP) specifications, European Telecommunications Standards Institute (ETSI) specifications, and/or other wireless communications standards in some implementations. RAN network functions are used in a radio network, typically running in cell towers and performing wireless signal to IP (Internet Protocol) conversion. Core network functions typically run in large data centers performing subscriber related business logic and routing IP traffic to the internet and back. According to the present disclosure, both core and RAN network functions can additionally or alternatively be run on an radio-based application processing server (RPS) provisioned as a virtualization server by a cloud provider, for example an edge device provisioned to a customer to implement a private 5G network, or used by a wireless service provider or the cloud provider to create a public 5G network. The term "radio-based application" (RBA) is used herein to refer to applications in which at least some messages are transmitted using radio frequency signals and associated antennas, such as those used for various generations (4G, and the like) of cellular broadband technologies. RBPASs may also be referred to as radio access network (RAN) pipeline processing servers, RAN servers, RAN application servers, or as radio-based application servers. Note that the techniques described herein are not limited to any particular generation of cellular broadband, nor are they limited to applications that utilize any particular portion of the electromagnetic spectrum for message transmissions.

The network functions executed at a compute instance of a virtualization server may, for example, be part of a distributed unit (DU) of a 5G radio technology stack used by an RBA in some embodiments. Some network functions executed at the NFA may be part of a physical layer, also referred to as L1 (Layer 1), of the RBA in at least one embodiment. Such physical layer network functions, may include, among others, a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function.

In addition to assigning network addresses, the CPSs may also perform a variety of other administrative tasks for NFAs incorporated within offloading cards of virtualization servers in various embodiments. For example, the CPSs may cause firmware or software to be installed and run at NFAs of the offloading cards, and apply updates including security patches to the firmware or software. In at least some embodiments, the CPSs may monitor the health state of the NFAs, e.g., by testing the responsiveness of the NFAs to messages whose transmission is caused by the CPSs, and provide representations of the health state via programmatic interfaces to VCS clients on whose behalf the NFAs are being used. Performance metrics of the NFAs, such as the total number of RBA messages processed or network functions run, may be collected and analyzed at the CPSs in some embodiments, and representations of the performance metrics may be presented via programmatic interfaces to the VCS clients. The CPSs may scrub or clean up memory of the NFAs in some embodiments as needed in some embodiments, e.g., after a particular compute instance which was using the NFA is terminated and before another compute instance which is going to use the NFA is launched, so that data which was stored in the NFA memory during the lifetime of the particular compute instance is not accessible by the other compute instance.

According to at least some embodiments, respective virtualized representations of an NFA of an offloading card may be presented to one or more compute instances running at a virtualization server. This may enable some network functions of respective RBAs or radio-base application pipelines to be run at the compute instances, with each of the RBAs utilizing the same shared NFA hardware for other network functions. Requests for the use of the NFA hardware may be submitted via, and received at, the NFA using programmatic interfaces of the virtualized representations. The virtualization of the NFAs may enable network slicing to be implemented at the virtualization servers, with different radio-based applications or pipelines being run at each of the compute instances and the NFA. The virtualized representations of the NFAs, which may be referred to as VNFAs, may enable each compute instance to utilize the shared NFA hardware via programmatic interfaces as though the instance had exclusive access to the NFA hardware, in a manner analogous to the way virtualized representations of other hardware devices (such as virtualized CPUs or virtualized I/O hardware devices) of the virtualization server enables compute instances to utilize those devices as though the devices were available for exclusive use.

According to some embodiments, a CPS may orchestrate the migration of at least a portion of workload of an RBA from one virtualization server (referred to as the migration source) to another virtualization server (the migration destination). The migration destination may include its own NFA, e.g., within its own offloading card. As a result of the migration, (a) messages from an RU of the RBA may be delivered to and processed at the NFA of the migration destination instead of at the NFA of the migration source and (b) a migrated version of a compute instance may execute other network functions of the RBA at the migration destination.

In at least one embodiment embodiments, a system may comprise one or more CPSs of a VCS of a cloud provider network, and a virtualization server which includes an NFA. A CPS may establish an isolated virtual network (IVN) on behalf of a client of the VCS, e.g., in response to a programmatic request from the client. An IVN, also referred to as a virtual private cloud (VPC) may comprise a set of resources that is logically isolated or separated from the rest of the resources of the VCS with respect to at least some types of networking configuration settings. For example, a given IVN may have one or more subnets with respective security settings chosen by the client, and/or a set of Internet Protocol (IP) addresses chosen by the client and assigned to compute instances or other entities configured within the IVN.

In various embodiments a CPS may store, within a repository of metadata of the IVN, in response to a first request submitted via a programmatic interface of the VCS by the client, a representation of a first security group associated with a compute instance launched at the virtualization server. A security group may comprise a set of network security rules in various embodiments. The compute instance may be assigned a first network address within the IVN, and the first security group may include restrictions on sources of inbound traffic directed to the compute instance (and/or restrictions on outbound traffic from the compute instance) using the network address. The compute instance may include software configured to execute a first network function of an RBA. A CPS may also store, within the repository in response to a second request submitted via the programmatic interface, a representation of a second security group or security rule set associated with the NFA. The second security group may include restrictions on destinations of outbound traffic from the network function accelerator (and/or restrictions on the sources whose traffic can be accepted at the NFA). In some embodiments, a CPS may assign a network address within an IVN to the NFA, to be used for communications between the NFA and an RU. The NFA may execute a second network function of the RBA.

A CPS may cause a verification, prior to a delivery of a first network message of the RBA to the compute instance using the first network address as a destination address, that the first network message is compliant with the restrictions of the first security group. The first network message may trigger execution of the first network function in some embodiments. A CPS may also cause a verification, prior to a delivery of a second network message of the RBA from the NFA to a destination such as an RU of the RBA, that the second network message is compliant with the restrictions of the second security group. In at least some embodiments, the NFA may be incorporated within an offloading card of the kind introduced above, which also includes one or more virtualization management components and one or more networking hardware devices (NHDs), with compute instances being launched at the virtualization server using the offloading card's virtualization management components, and a substrate address being assigned to an NHD by a CPS. Additional configuration settings of the compute instance and/or the NFA may also be stored by CPSs.

CPSs may enforce traffic rate limits or traffic shaping rules on NFAs in some embodiments. For example, a CPS may determine a rate limit to be applied to network messages directed to or from an NFA, e.g., based on a programmatic request from the VCS client on whose behalf the NFA is being used, and cause packets directed to or from the NFA to be dropped if delivery of the packets would cause the rate limit to be violated. Such rate limits may be stored as part of a collection of configuration settings maintained by the CPSs.

In some embodiments, route table entries for mid-haul traffic (traffic between distributed units (DUs) and centralized units (CUs)) of the RBA which utilizes the NFA may be stored by a CPS. At least some messages of the mid-haul traffic may be generated at the compute instance in such embodiments; in other embodiments, some mid-haul traffic messages may be generated at the NFA. Respective distinct security groups or security rule sets may be stored for front-haul traffic and mid-haul traffic in some embodiments. In one embodiment, a CPS may assign a network address within an IVN to an NFA, and that address may be used for communication between the NFA and an RU. According to at least one embodiment, in addition to or instead of using security groups which define inbound and outbound traffic restrictions, a VCS client may decide to use network access control lists (ACLs) to manage traffic security, and the ACLs chosen by the client may be stored and enforced by CPSs. In one embodiment, messages directed to the compute instances which run on the RPSs may be formatted in accordance with the Internet Protocol (IP), while a different protocol (such the Common Public Radio Protocol (CPRI) or enhanced CPRI (eCPRI)) may be used for at least some messages exchanged between RUs and NFAs. In some implementations the CPRI or eCPRI messages may be sent over IP (e.g., using an encapsulation protocol).

According to various embodiments, a server may comprise a processor, a memory, and an offloading card. The offloading card may comprise a virtualization manager or virtualization controller, and an NFA for RBAs. The virtualization manager may perform one or more configuration tasks pertaining to a compute instance launched at the server, including allocation of at least a portion of the memory for use by the compute instance. The memory may store instructions that when executed on the processor run a first network function of an RBA at the compute instance, and cause a second network function of the RBA to be executed at the NFA. Input of the second network function may be based at least in part on output of the first network function; e.g., the instructions when executed on the processor may cause output of the first network function to be provided as input to the second network function which is executed at the NFA.

The offloading card may include a networking hardware device (NHD), to which an address of a substrate network of a VCS may be assigned in some embodiments. The networking hardware device may be used to transmit messages of the RBA from the compute instance running at the server to other compute instances running at other servers. The messages may be transmitted, using an NHD, by a network processing offloader running at the offloading card in one embodiment. In some embodiments, multiple NHDs may be incorporated within the offloading card, with one of the NHDs being used for transmitting messages to a first set of destinations including a centralized unit (CU) of the RBA (and receiving messages from those destinations), while another NHD is used for transmitting messages to (and receiving messages from) a second set of destinations including a radio unit (RU) of the RBA. In one embodiment, an address within a range of addresses selected for an IVN may be assigned to an NHD used for RU communications.

According to some embodiments, multiple NFAs may be incorporated within the offloading card, with each NFA being employed for executing a respective set of network functions of one or more RBAs. In some cases, different network functions of a single RBA may be executed at respective NFAs of the card. In other cases, respective NFAs of the card may be employed to execute network functions of respective applications. In one embodiment, instructions executed at a CPU may cause different sets of input (e.g., comprising output generated at respective network functions run at compute instances of the virtualization server) to be received at respective network functions run at respective NFAs. Virtualized representations of an NFA may be presented to respective compute instances launched at the server in one embodiment, enabling requests for accelerated network functions from each of the compute instances to be received (using programmatic interfaces provided as part of the respective virtualized representations) independently of each other at the NFA. CPSs of a VCS may perform administrative tasks on the NFAs in various embodiments, including causing firmware/software to be installed and updated at the NFAs. In some embodiments, the network functions executed at a given NFA may implement a portion of a distributed unit (DU) of a RAN node (e.g., a gNodeB or an eNodeB) or RBA, a portion of a centralized unit (CU), and/or a portion of a core network of the RBA, e.g., in addition to or instead of executing physical layer network functions of the kind listed earlier.

In some embodiments, a virtualization server being used as an RPS may be set up as part of an extension resource group (ERG) of the cloud provider network configured at a premise external to the primary data centers of a provider network at which the control plane servers are located. An ERG may be located, for example, in the vicinity of to a set of cell towers or antennas, in response to requests from VCS clients wishing to run radio-based applications on resources managed by the VCS control plane. In other embodiments, RPSs may be set up at local zones, third-party data centers and/or at the data centers of the provider network. A given ERG may share some administrative resources among its member servers in some embodiment, such as a local agent of the VCS control plane. In at least some embodiments, the servers used for ERGs may be configured by the provider network operator with the appropriate hardware (e.g., including network function accelerator cards), software and firmware and then shipped to the premises where the ERGs are utilized. In some embodiments, at least some of the servers such as RPSs may require relatively little physical space (e.g., some RPSs supplied by the provider network operator, may only take up one rack unit (1U) or a small number of rack units in a standard data center rack). In at least some embodiments, the RPSs set up as part of ERGs or run at premises external to the data centers of the provider network may comprise a number of hardware, software and/or firmware elements that are especially designed to enable remotely generated virtualization-related administrative commands to be executed in a safe and secure manner, without for example requiring messages to be sent back to the sources from which the command were originally issued. In some embodiments, such elements may include trusted platform modules (TPMs) or other security modules incorporated within the offloading cards, tamper-resistant storage devices whose contents can only be decrypted as long as the storage devices are physically attached to a particular RPS and so on. In at least some embodiments, such an RPS may comprise a VCS control plane agent that does not make outbound calls and implements an API for inbound commands that is protected using TLS (Transport Layer Security) sessions. Such an API may have strong authorization, authentication and accounting-related controls in various embodiments. In at least some embodiments, no shared secrets associated with virtualization management may be stored within an RPS itself.

In some embodiments, a secure network channel, such as a virtual private network (VPN) tunnel or VPN connection, may be established between an RPS and resources located within the provider network data centers, and such a channel may be employed for sending commands from the VCS to the RPS. For example, respective one way secure network channels may be used to transmit commands originally generated at the control plane servers in response to client requests (including requests to launch RCIs) for eventual execution at an RPS. In one embodiment, a secure channel to be used for such commands may be set up between one or more resources at an RPS (such as a VCS connectivity manager) and one or more resources within an IVN of the client at whose request an RCI is to be launched at the RPS.

An RPS can serve as a source or destination of several different types of IP traffic, including traffic between different layers of a radio-based technology stack being used for RBAs, traffic to and from other resources within the provider network, traffic to and from resources in client networks established at client premises, traffic to and from the public Internet, and so on. A given RPS can be equipped with several different kinds of networking hardware devices (NHDs) that can be employed for the IP traffic, including for example default network interface cards, networking chipsets within NFAs, networking chipsets within virtualization management offloading cards, and so on. Network management logic provided by the provider network can be used to intelligently select the most appropriate NHD to be used for a given category of IP traffic of an RPS during a given time interval, thus enabling the best use of the available IP networking resources of the RPS to achieve quality of service targets of the applications being run at the RPS. For example, depending on the types of RBAs being run, a different NHD can be used for front-haul traffic of the radio-based applications than is used for mid-haul traffic for at least some time periods. Software programs (e.g., programs developed by third-party vendors or by the provider network operator) which implement part of a RBA can be run within runtime environments (RTEs) such as radio-optimized compute instances or radio-optimized software containers at an RPS. In some embodiments, a given RPS or a given NFA may be employed for several different RBAs or pipelines, e.g., on behalf of a single client of the provider network or on behalf of different clients. As a result of such multi-tenancy, the overall amount of computing resources and/or power consumed for implementation of several different RBAs can be reduced substantially. The reduction in the resources used, which can translate into lower costs, in turn enables new entrants into the radio-based application space, and the design of new types of applications.

According to some embodiments, a provider network may comprise a radio-based application management service (RBAMS) which implements programmatic interfaces pertaining to the configuration of RPSs. An indication of an expected geographical distribution of end-user requests (e.g., cell phone calls, text messages, IoT sensor inbound and outbound messages, etc.) of a radio-based application may be obtained at the RBAMS via such programmatic interfaces. The information about the geographical distribution may be used at the RBAMS to select or recommend one or more premises at which ERGs and/or RPSs of one or more categories supported by the provider network should be configured for the client. If the client indicates an approval of the recommendations, one or more RPSs may be configured on behalf of the client at such premises and assigned to the clients' applications by the RBMAS in such embodiments. The premises may include, for example, a point-of-presence site of the provider network, a local zone premise of the provider network, or a client-owned premise.

In one embodiment, a given network function accelerator (NFA) (or a portion of an NFA) at an offloading card may be configured for exclusive use for a single client of the provider network (or a single radio-based application of a client on whose behalf multiple radio-based applications are run), e.g., in response to a single-tenancy request from the client. Multiple NFAs of a single RPS (e.g., at a single offloading card) may be employed for a single radio-based application in some embodiments. Respective NFAs of a given offloading card may be employed for respective RBAs in other embodiments. In one embodiment, NFAs may be configured as backups to other NFAs, e.g., to be used in response to detecting failures or overloads at the other NFAs. In some embodiments, one or more NFAs of an RPS may be incorporated into the virtualization management offloading card which also includes virtualization management components, while one or more additional NFAs of the RPS may be incorporated into other cards which do not include virtualization management components.

In at least some embodiments, a variety of metrics may be collected (e.g., by control plane servers of the VCS or the RBAMS) from the NFAs and provided to clients via programmatic interfaces if desired; such metrics may include inbound or outbound message transfer counts or message transfer rates, failure rates of NFAs, utilization levels of the local processors, memory and other resources of the NFAs, and so on in different embodiments. In one embodiment, metrics (e.g., resource utilization information) from multiple NFAs at an RPS may be collected and used to select which particular NFA should be utilized to execute a particular network function.

As mentioned above, an RPS may be configured at least in part using resources of a provider network in some embodiments. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

The cloud provider network can include a physical network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the cloud provider network, for example it may not be possible to route from a substrate network address to an address in a production network that runs services of the cloud provider, or to a customer network that hosts customer resources.

The cloud provider network can also include an overlay network of virtualized computing resources (e.g., compute instances, block store volumes, data objects such as snapshots and machine images, file storage, databases) that run on the substrate. In at least some embodiments, virtualization management components such as hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., IVNs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines or compute instances on the host. A hypervisor, or virtual machine monitor, run on a host (or on an offloading card attached to the host) allocates the host's hardware resources amongst various compute instances on the host and monitors the execution of the virtual machines. Each compute instance may be provided with one or more IP addresses in the overlay network, and the virtual machine monitor on a host may be aware of the IP addresses of the compute instances on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the cloud provider network for routing packets between endpoints.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. As described herein, customers may also be able to connect to availability zones of the cloud provider network by way of RAN-enabled edge locations managed by the cloud provider, which may in turn have direct connections into the cloud provider network (e.g., a private fiber connection between customer facilities and cloud provider facilities) or which may transit other intermediate networks (such as the Internet) and enter the cloud provider network via a TC. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

An edge location (or "edge zone"), as referred to herein, can be structured in several ways. In some implementations, an edge location can be an extension of the cloud provider network substrate including a limited quantity of capacity provided outside of an availability zone (e.g., in a small data center or other facility of the cloud provider that is located close to a customer workload and that may be distant from any availability zones). Such edge locations may be referred to as local zones (due to being more local or proximate to a group of users than traditional availability zones). A local zone may be connected in various ways to a publicly accessible network such as the Internet, for example directly, via another network, or via a private connection to a region. Although typically a local zone would have more limited capacity than a region, in some cases a local zone may have substantial capacity, for example thousands of racks or more. Some local zones may use similar infrastructure as typical cloud provider data centers.

In some implementations, an edge location may be an extension of the cloud provider network substrate formed by one or more servers located on-premise in a customer or partner facility, wherein such server(s) communicate over a network (e.g., a publicly-accessible network such as the Internet) with a nearby availability zone or region of the cloud provider network. This type of substrate extension located outside of cloud provider network data centers can be referred to as an "outpost" of the cloud provider network or as a VCS extension resource group. Some outposts may be integrated into communications networks, for example as a multi-edge cloud having physical infrastructure spread across telecommunication data centers, telecommunication aggregation sites, and/or telecommunication base stations within the telecommunication network. In the on-premise example, the limited capacity of the outpost may be available for use only be the customer who owns the premises (and any other accounts allowed by the customer). In the telecommunications example, the limited capacity of the outpost may be shared amongst a number of applications (e.g., games, virtual reality applications, healthcare applications) that send data to users of the telecommunications network.

An edge location can include data plane capacity controlled at least partly by a control plane of a nearby availability zone. As such, an availability zone group can include a "parent" availability zone and any "child" edge locations homed to (e.g., controlled at least partly by the control plane of) the parent availability zone. Certain limited control plane functionality (e.g., features that require low latency communication with customer resources, and/or features that enable the edge location to continue functioning when disconnected from the parent availability zone) may also be present in some edge locations. Thus, in the above examples, an edge location refers to an extension of at least data plane capacity that is positioned at the edge of the cloud provider network, close to customer devices and/or workloads.

As mentioned above, some cloud provider networks may provide support for local zones, a type of infrastructure deployment that places some of the provider network's compute, storage, database, and other select services close to large population, industry, and IT centers or other desired locations which may not be very near the provider network's primary data centers. With such local zones, applications that need single-digit millisecond latency can be run closer to end-users in a specific geography. Local zones provide a high-bandwidth, secure connection between local workloads and those running in a provider network region, allowing provider network clients to seamlessly connect to their other workloads running in the region and to the full range of in-region services through the same APIs and tool sets.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, a virtualized computing service (VCS) or a cloud compute service). This service may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In one embodiment, each of the virtual compute instances may correspond to one of several instance types or families. An instance type may be characterized by its hardware type, computational resources (e.g., number, type, and configuration of central processing units [CPUs] or CPU cores, NFAs or other accelerators), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as being a "burstable" instance type that has a baseline performance guarantee and the ability to periodically burst above that baseline, a non-burstable or dedicated instance type that is allotted and guaranteed a fixed quantity of resources, or an instance type optimized for radio-based applications). Each instance type can have a specific ratio of processing, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on.

The computing services of a provider network can also include a container orchestration and management service (referred to in various implementations as a container service, cloud container service, container engine, or container cloud service). A container represents a logical packaging of a software application that abstracts the application from the computing environment in which the application is executed. For example, a containerized version of a software application includes the software code and any dependencies used by the code such that the application can be executed consistently on any infrastructure hosting a suitable container engine (e.g., the Docker® or Kubernetes® container engine). Compared to virtual machines (VMs), which emulate an entire computer system, containers virtualize at the operating system level and thus typically represent a more lightweight package for running an application on a host computing system. Existing software applications can be "containerized" by packaging the software application in an appropriate manner and generating other artifacts (e.g., a container image, container file, or other configurations) used to enable the application to run in a container engine. A container engine can run on a virtual machine instance in some implementations, with the virtual machine instance selected based at least partly on the described network performance metrics. RBA components may be run using containers in at least some embodiments. Other types of network-accessible services, such as packet processing services, database services, wide area networking (WAN) services and the like may also be implemented at the cloud provider network in some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information management). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

FIG. 1 illustrates an example system environment in which virtualization servers whose virtualization management offloading cards include hardware network function accelerators may be employed for radio-based applications run at least partly using resources of a virtualized computing service, according to at least some embodiments. As shown, system 100 comprises resources and artifacts of a virtualized computing service (VCS) 110, including control plane servers 140 and a set of virtualization servers including category-A virtualization servers, category-B virtualization servers and category-C virtualization servers. The virtualization server categories may differ from one another in the kinds of virtualization management offloading cards (VMOCs) included in the servers of each category in the depicted embodiment, and/or in the primary processors (CPUs), memory and other resources included in the servers, and may therefore be used for different types of applications. For example, an enhanced-for-radio-applications VMOC (EVMOC) 118 at a category-A virtualization server 150 may comprise a type-A network function accelerator (NFA) 172, an EVMOC 119 at a category B virtualization server 152 may comprise a type-B NFA 177, while a baseline VMOC 166 at category-C virtualization server 182 may not include any NFA in the depicted embodiment. The NFAs 172 and 177 may differ in the kinds of network functions they are capable of accelerating, the speed with which they can execute network functions of a particular kind, the vendors that developed the chipsets used for the NFAs, and so on. As a consequence of the differences in properties of their respective NFAs, category-A virtualization servers may be better suited for one class of radio-based applications, while category-B virtualization servers may be better suited for a different class of radio-based applications. Category-C virtualization servers may be suited for general purpose applications which do not require hardware acceleration of network functions. Category-A and category-B virtualization servers, which are equipped with NFAs, may both be referred to as radio-based application processing servers or RPSs in various embodiments.

Virtualization servers of each of the categories shown in FIG. 1 may be utilized to run compute instances (CIs) on behalf of VCS clients. Some compute instances run at category-A or category-B virtualization servers may include programs implementing one or more network functions of radio-based applications, and may therefore be referred to as radio-optimized compute instances (RCIs). The network functions run at an RCI using the primary processors of the virtualization server may differ from the network functions run at NFAs—e.g., the network functions run at the RCIs may belong to a different layer of the radio-based application technology stack than the network functions run at the NFAs of the servers. In FIG. 1, RCI 125A may be run at category-A virtualization server 150, while RCI 125B may be run at category-B virtualization server 152. Compute instance CI 129, which may not include programs implementing RBAs may be run at category-C virtualization server 182 in the depicted embodiment. Note that in some cases, compute instances implementing one or more RBA network functions may be run at virtualization servers (such as category-C virtualization servers) that do not include NFAs; in such cases, the network functions may be run using the primary processors of the virtualization server, and may not require hardware accelerators such as NFAs. In some embodiments, one or more RBA network functions may be run at an NFA of a virtualization server, but not necessarily at the primary processors of the virtualization server.

Compute instances may be launched at the virtualization servers in response to commands sent from control plane servers 140 such as instance state managers 102 in the depicted embodiment. An EVMOC or VMOC may comprise an offloaded virtualization controller (OVC), also referred to as a virtualization manager or a virtualization coordinator in some embodiments, which may be sent commands from the control plane as part of the process of launching compute instances. For example, EVMOC 118 includes OVC 173A, EVMOC 119 includes OVC 173B, and baseline VMOC 166 includes OVC 173C. OVCs may perform various virtualization tasks such as launching other virtualization management components including on-server virtualization management components 126A, 126B or 126C which run on the primary processors of the servers, allocating a portion of the virtualization server's main memory for use by individual compute instances, and so on in various embodiments.

EVMOCs and VMOCs may also include one or more networking hardware devices (similar in functionality to network interface cards or NICs), such as NHD 174A, NHD 174B and NHD 174C at EVMOC 118, EVMOC 119 and baseline VMOC 166 respectively in the depicted embodiment. The NHDs may be used for transmitting network messages to and from the virtualization servers, including messages to and from the control plane servers 140, messages to and from other virtualization servers, messages to and from other provider network services such as storage services and the like. In at least some embodiments, control plane servers such as networking managers 106 may assign an address within a substrate network to at least one NHD of each virtualization server, and that address may be used for subsequent communication with the control plane servers and with other virtualization servers. Networking managers 106 may also assign network addresses (which are not part of the substrate network) to compute instances, e.g., within network address ranges chosen by VCS clients for their isolated virtual networks (IVNs) in some embodiments. Since multiple compute instances may be set up at a given virtualization server with a given NHD, with respective network addresses assigned to each compute instance, a mechanism for delivering messages directed to the instances' respective network addresses while using the same underlying NHD may be implemented at the VCS in the depicted embodiment. Mappings between the substrate addresses and the addresses assigned to compute instances may be maintained by the networking managers 106 in some embodiments, e.g., as part of isolated virtual network IVN metadata 111.

In at least some embodiments, a control plane server such as a networking manager 106 or an NFA manager 104 may also assign network addresses to the NFAs of the EVMOCs, which can be used for communications between the NFAs and cells 154 of radio-based applications. Cell 154A may comprise cell software 155A and antennas 156A associated with a radio unit (RU) of an RBA being implemented using RCI 125A, while cell 154B may comprise cell software 155B and antennas 156B of an RU of an RBA being implemented using RCI 125B. In some embodiments, an EVMOC may comprise multiple NHDs, with one NHD being assigned a substrate network address and another NHD being assigned a different address (e.g., an IVN address) used for communication between the NFA and an RU. In one embodiment, a single NHD may be assigned multiple addresses by the VCS control plane servers, including one address used for RU traffic and another address used for traffic directed to/from compute instances. In another embodiment, an NFA may comprise one or more NHDs, which can be managed by the control plane servers and employed for communication with RUs and/or centralized units (CUs) of RBAs.

Control plane servers referred to as NFA managers 104 may be responsible for performing various administrative tasks pertaining to NFAs in the depicted embodiment. Such tasks may include, among others, transmitting firmware/software to be used at the NFAs, causing the firmware/software to be installed and executed at the NFAs, applying security patches to the firmware/software as needed, scrubbing/cleaning contents of memory of the NFAs after an RCI has terminated so that data of the RBA that was being run at the terminated RCI cannot be accessed by other RCIs launched later, and so on. In addition to collecting and analyzing health state and performance information from other resources within the VCS, health and performance metrics managers 112 of the VCS control plane may collect and analyze health state and performance metrics from NFAs and expose the collected metrics to VCS clients on whose behalf the NFAs are being used in at least some embodiments.

In various embodiments, the instance state managers 102 and/or other control plane servers may be responsible for coordinating or orchestrating the migration (e.g., working together with on-serve VMCs or OVCs) of workloads of RBAs from one RPS to another. In at least some embodiments, a respective virtualized representation of an NFA of a virtualization server may be presented to each of one or more RCIs launched at the server, enabling different RBAs being run at the RCIs to share a single NFA device to execute a subset of network functions of the RB As.

In some embodiments, any of a variety of network functions of the physical or L1 layer of a radio-based technology stack may be implemented at an NFA 172 or an NFA 177. In other embodiments, an NFA may execute network functions of distributed units (DUs), centralized units (CUs) and/or core network components of RBAs. In some embodiments, a given EVMOC may comprise several different NFAs, each comprising hardware optimized to accelerate a different kind of network function or a different set of network functions.

As mentioned earlier, an isolated virtual network (IVN) may include a set of resources that is logically isolated or separated from the rest of the resources of the VCS with respect to at least some types of networking configuration settings in various embodiments. For example, a given IVN may have one or more subnets with respective security settings, and/or a set of IP addresses, individual ones of which may be assigned to individual compute instances set up at one or more virtualization servers in some embodiments. For virtualization servers that include NFAs, IVN features may be supported for the traffic of the NFAs as well as the traffic directed to/from compute instances. For example, networking managers 106 may include, within IVN metadata 111, security rule sets such as security groups (which define restrictions on traffic destinations and/or sources) or network ACLs applicable to traffic directed to/from NFAs in some embodiments, and may ensure that compliance with such security rules is verified for messages directed to/from the NFAs. The security settings to be enforced for NFAs may be provided via programmatic interfaces by VCS clients, in a manner analogous to the way security settings for compute instances' traffic are provided by the VCS clients. In one embodiment, respective sets of client-specified security rules may be enforced for front-haul traffic (traffic between RUs and DUs of an RBA), mid-haul traffic (traffic between DUs and CUs of an RBA), and back-haul traffic (traffic between CUs and core network components of an RBA) by networking managers of the VCS control plane. In various embodiments, other benefits associated with the use of IVNs, such as automated encryption of traffic sent to/from addresses assigned within IVNs, may automatically be obtained for traffic directed to from NFAs incorporated within EVMOCs.

In some embodiments, route table entries provided to the VCS control plane by clients using programmatic requests may be stored as part of IVN metadata 111 and employed to direct traffic originating at or addressed to NFAs as well as compute instances. Networking managers 106 may obtain traffic shaping rules or rate limits from VCS clients via programmatic interfaces in some embodiments, and enforce the rate limits for traffic to/from compute instances or to/from NFAs (e.g., by dropping or discarding packets whose delivery would violate the rate limits). In general, in the depicted embodiment, NFAs may be administrated by VCS control plane servers as first-class entities within IVNs of the VCS, in a manner similar to the way compute instances and entities such as load balancers, virtual routers, gateways and the like are administered by the VCS control plane servers. Note that at least in one embodiment, at least some virtualization servers or RPSs may be used in a multi-tenant mode, so a given server may potentially be used for compute instances set up on behalf of several different clients, with compute instances of several different IVNs potentially being instantiated on one server. Some virtualization servers used for RBAs may be located at provider network data centers in different embodiments, while others may be located at premises external to the data centers. In various embodiments, one or more network functions of one or more RBAs may be executed using the primary processors (e.g., CPUs) of an RPS, and not using an NFA. A decision as to whether a given network function is executed at an NFA or at a primary processor may be made based on a variety of factors in different embodiments—e.g., in some cases the decision may be based on policies indicated via programmatic interfaces by a client, in other cases the decision may be made dynamically (e.g., by a control plane server) based on analysis of metrics/failures/errors, and so on.

Figure 2:
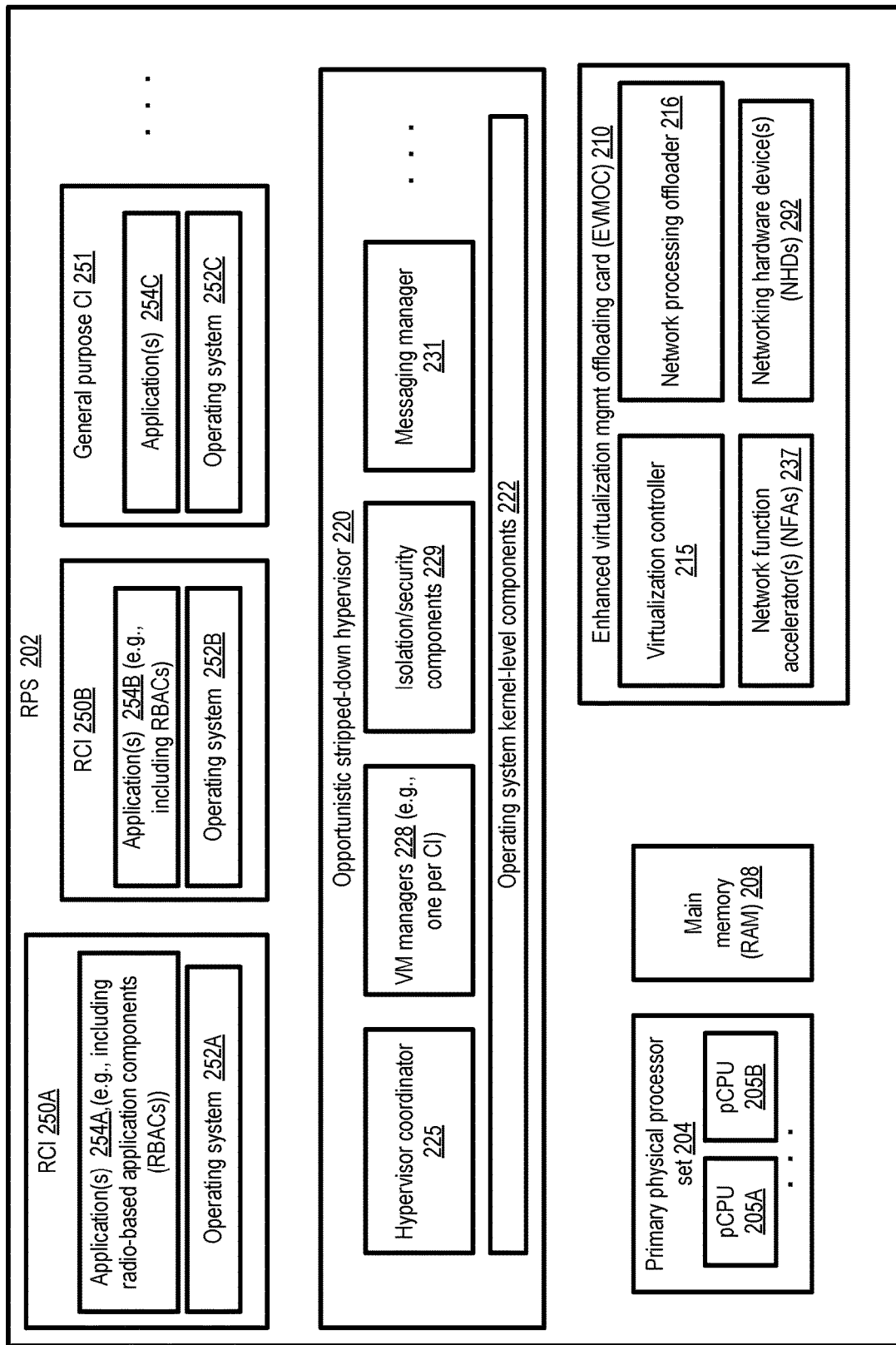
FIG. 2 illustrates an example configuration of a radio-based application processing server with partially offloaded virtualization management functionality, according to at least some embodiments.

As indicated in FIG. 1, some virtualization management components of a virtualization server (such as OVCs) may be executed on offloading cards, while other components (such as on-server VMCs) may be executed on the primary processors of the server. FIG. 2 illustrates an example configuration of a radio-based application processing server with partially offloaded virtualization management functionality, according to at least some embodiments. As shown, a radio-based application processing server (RPS) 202 may comprise a primary physical processor set 204, a main memory (e.g., one or more modules of random access memory or RAM) 208, an enhanced virtualization management offloading card (EVMOC) 210, an opportunistic stripped down hypervisor 220 which runs on the primary physical processors, and one or more radio-optimized compute instances (RCIs) 250, such as RCIs 250A and 250B. In some embodiments, a given RPS may also be used to run one or more general purpose compute instances, such as general purpose CI 251, which may not be optimized for radio-based applications. EVMOC 210 may include one or more NFAs 237, one or more networking hardware devices (NHDs) 292, a virtualization controller 215 and a network processing offloader 216 in the depicted embodiment. RPS 202 may also comprise a number of other components, e.g., various persistent storage devices, which are not shown in FIG. 2. The primary physical processor set 204 may comprise a number of physical CPUs (pCPUs, also referred to as primary processors), including pCPUs 205A and 205B in the depicted embodiment. Virtualized versions of the pCPUs, called vCPUs or virtual CPUs, may be allocated to individual RCIs and/or general-purpose CIs by virtualization management components, e.g., the hypervisor and/or the virtualization controller during the lifetime of the compute instances. Each compute instance may comprise a respective instance of an operating system (e.g., operating systems 252A, 252B and 252C) and a set of applications (e.g., 254A, 254B and 254C) being run on behalf of clients of a virtualized computing service (VCS) with functionality similar to VCS 110 of FIG. 1.

The virtualization controller, network processing offloader and the hypervisor 220 may be referred to collectively as a partially offloaded virtualization manager or PVM, as part of the virtualization management tasks needed at the RPS may be performed by the hypervisor using the pCPUs, while remaining virtualization management tasks may be performed at the offloading card. The network processing offloader 216 may implement one or more networking protocols (including for example an encapsulation protocol used within the VCS) and act as an intermediary between the compute instances and networking endpoints outside the RPS in the depicted embodiment. In at least one embodiment the VCS control plane may communicate with the network processing offloader 216 to perform networking-related configuration operations at the RPS, such as assignment of network addresses, changing/applying IVN related settings, and so on. A network processing offloader 216 may transmit, using an NHD, messages between compute instances and endpoints or destinations external to the virtualization server, and/or messages between network functions executed at NFAs 237 and endpoints or destinations external to the virtualization server in various embodiments. Similarly, a network processing offloader may receive messages from sources external to the virtualization server via an NHD, and send it on to an NFA 237 or to a compute instance 250 or 251 depending on the destinations indicated in the messages. The virtualization controller 215, network processing offloader 216, and/or NFAs 237 may be implemented using a respective system-on-chip design in some embodiments, e.g., incorporated within a shared offloading card which is linked to the pCPUs via a peripheral interconnect. In other embodiments, field-programmable gate arrays (FPGAs), digital signal processors (DSPs) or other technologies may be used to implement virtualization controllers, networking processing offloaders and/or NFAs. Although the virtualization controller 215, the network processing offloader 216 and the NFAs 237 are shown as being incorporated within a single offloading card (e.g., a PCIe card) in the depicted embodiment, other approaches regarding the arrangement and organization of these components may be employed in different embodiments. For example, in one embodiment, a single system-on-chip implementation may be used to perform the functions of the virtualization controller and the network processing offloader. In another embodiment, respective offload cards may be used for the virtualization controller 215, the network processing offloader 216 and/or one or more NFAs 237. The virtualization controller, as suggested by its name, may be responsible for organizing or orchestrating much of the virtualization management work performed at the RPS 202 in the depicted embodiment—e.g., it may be the first of the components of the PVM to boot, trigger the launches of the other components of the PVM, communicate with the VCS control plane, make memory allocation decisions with respect to compute instances, and so on. In at least one embodiment the network processing offloader may select a particular NHD 292 to be used for a particular category of RPS traffic (e.g., mid-haul traffic, front-haul traffic or back-haul traffic of an RBA, or traffic that is not transmitted for an RBA).

Hypervisor 220 may be described as being stripped-down in the depicted embodiment because much of the work performed by at least some conventional hypervisors may be handled at the EVMOC 210, thereby reducing the complexity and size of the hypervisor 220. In addition, hypervisor 220 may be designated as opportunistic because, under most circumstances, it may wait until a compute instance voluntarily relinquishes control of a pCPU 205 before the hypervisor uses CPU cycles. Thus, for example, when a particular compute instance 250 or 251 issues an I/O request (where the I/O is expected to take approximately time T1 to complete) and gives up a pCPU until a response to the I/O request is received, the hypervisor may make use of this opportunity to use the pCPU to perform one or more virtualization management tasks (which may typically take time T2, where T2<<T1) while the compute instance is not expecting to use the pCPU. As such, the hypervisor 220 may have a minimal impact on the performance of applications 254 (which may include radio-based applications) in the depicted embodiment.

The hypervisor 220 may itself comprise a number of subcomponents in the depicted embodiment, including a set of operating system kernel-level components 222, a hypervisor coordinator 225, one or more virtual machine (VM) managers 228, isolation/security components 229, and/or a messaging manager 231. The hypervisor coordinator 225, individual ones of the VM managers 228, the isolation/security components 229 and/or the messaging manager 231 may be implemented as respective user-mode processes in at least some embodiments. In various embodiments, at least some of these components may be implemented as instances of respective statically linked programs, communicating with one another via pipes using simple, specialized protocols. The subcomponents of the hypervisor may remain passive or quiesced by default in the depicted embodiment, reacting and activating only in response to events (such as messages from other subcomponents, context switches initiated by compute instances, etc.).

The kernel-level components 222 may provide support for various low-level operations such as the initial responses to VM exit instructions issued by the compute instances (e.g., when a compute instance gives up a pCPU). The hypervisor coordinator 225, as implied by the name, may be responsible for orchestrating operations of the other subcomponents. The hypervisor coordinator 225 may, for example, implement an API which can be used for communications between the components at the EVMOC and the hypervisor, initiating compute instance launches and terminations (e.g., at the request of the virtualization controller), exposing metrics collected by the VM managers, providing debugging capabilities, and so on.

Each VM manager 228 may be responsible for launching or instantiating a respective compute instance based on a specification provided by the coordinator 225, monitoring metrics and logs of the compute instance, and so on. In some embodiments a VM manager 228 may also help with compute-instance-requested I/O operations for certain devices, e.g., by trapping I/O requests and translating them to memory-mapped I/O operations completed with the help of an offloaded virtualization management component.

The messaging manager 231 may act as an intermediary between the virtualization controller 215 and the hypervisor, e.g., by translating commands issued using a queue-based protocol by the virtualization controller into pipe messages within the hypervisor. The security and isolation components 229 may be responsible, for example, for scrubbing or cleaning up compute instance memory when a compute instance terminates, so that inadvertent sharing of data across compute instances can be avoided. In some embodiments, the security and isolation components may also be responsible for scrubbing or cleaning up memory of the NFAs 237, e.g., in response to commands issued by NFA managers of the VCS control plane.

Programs implementing virtualized network functions at one or more layers of a radio-based technology stack may be run as part of the applications 254A or 254B of the RCIs in the depicted embodiment. Other network functions may be executed at the NFAs, e.g., in response to requests or messages transmitted from RUs and/or from the programs implemented at the applications. Various aspects of the configuration of the compute instances and the NFAs may be managed by control plane servers of the VCS as described above.

The EVMOC 210 may include several other components not shown in FIG. 2 in some embodiments. A secure boot ROM incorporated within the EVMOC may be used for an initial phase of a multi-phase boot operation by the virtualization controller in one embodiment. The EVMOC may also include a security module (such as a trusted platform module (TPM)), which may also be used extensively during the boot procedure and/or for post-boot state verification. In addition, the EVMOC 210 may comprise a number of storage, power and connectivity-related components in various embodiments. For example, one or more flash devices/interfaces (or SSDs) may be incorporated within the offload card. These devices may be used, for example, to store firmware and/or software corresponding to various virtualization management components, compute instance components, NFAs, and the like. PCIe interfaces of the EVMOC may be used for communicating with the hypervisor and/or in various embodiments. In other embodiments, other types of interconnects and corresponding interfaces may be used, such as variants of USB, the QuickPath interconnect (QPI) or the UltraPath interconnect (UPI). The EVMOC 210 may also comprise a power source in some embodiments, e.g., sufficient to keep the components of the EVMOC working for at least some targeted number of hours or days in the event of extended power failures. In some implementations, a supercapacitor-based power source may be used.

Figure 3:
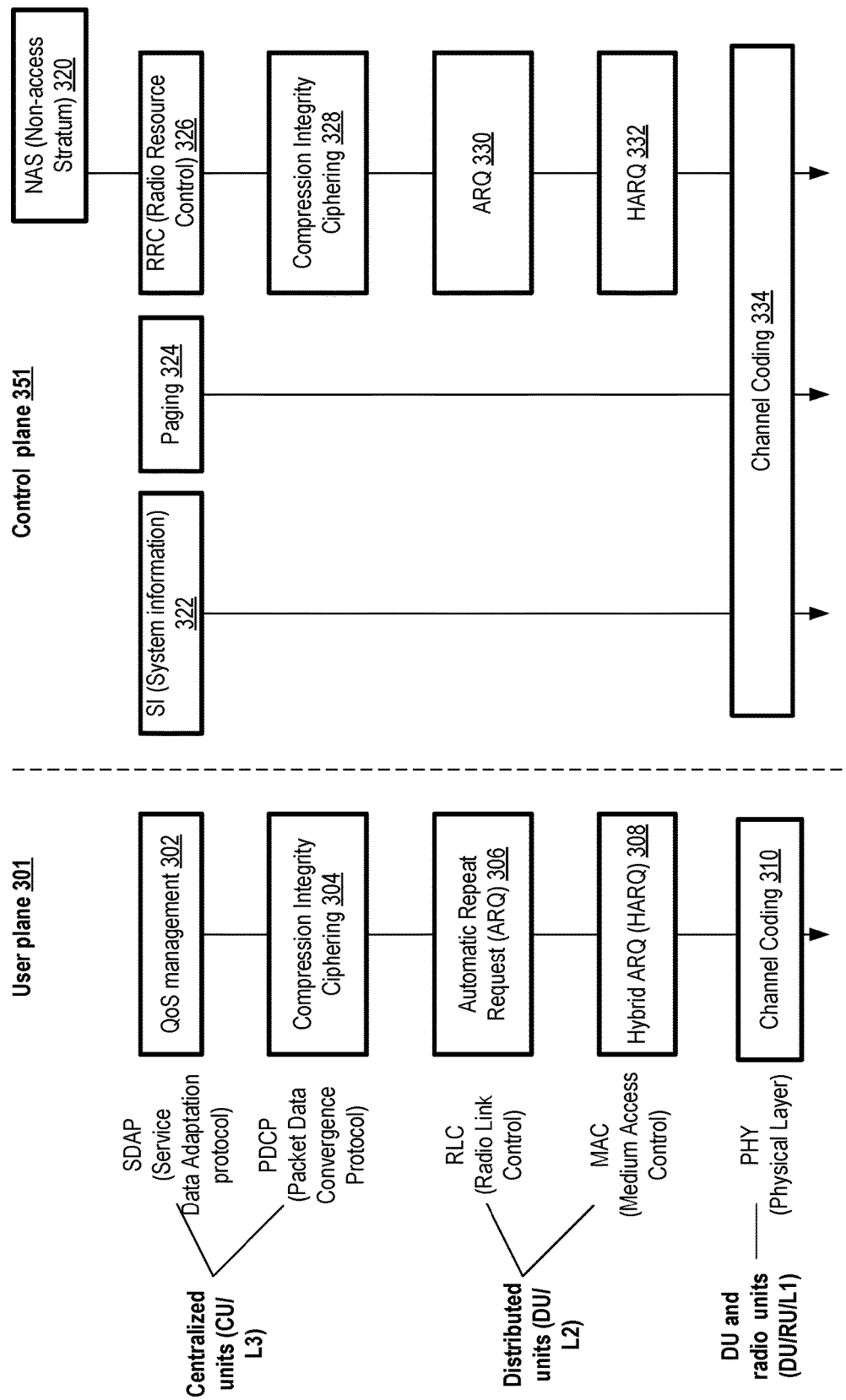
FIG. 3 illustrates an overview of user plane and control plane layers defined in accordance with a radio-based application technology standard, according to at least some embodiments.

FIG. 3 illustrates an overview of user plane and control plane layers defined in accordance with a radio-based application technology standard, according to at least some embodiments. The arrows shown in FIG. 3 represent the downlink communication path (from the higher levels of the standard, often implemented at back-end servers, downwards to the lower levels which are implemented using front-end components such as radio antennas and network function accelerators of the kind introduced above). The depicted layers conform to a 5G-NR standard published by 3GPP (Third Generation Partnership Project), a group of organizations responsible for defining protocols for mobile communications; similar layers are also defined for other generations of cellular communication technology.

In a manner somewhat analogous to the subdivision, discussed above, of a provider network functionality into control plane and data plane functionality, the operations needed for radio-based applications are divided into control plane operations and user plane operations. Control plane operations include connection configuration and other administrative tasks such as monitoring, while user plane operations involve transmission of user data using Internet Protocol (IP) packets.

The 5G-NR protocol stack comprises three layers, referred to as L1 (layer 1), L2 (layer 2) and L3 (layer 3). Standardized interfaces for communications between the layers (and between sub-layers of individual layers) have been defined; this allows network functions of the layers and sub-layers to be mapped flexibly to different hardware and/or software components as long as the interfaces and performance requirements of the protocol stack can be met. Logic for executing the functionality of the layers is distributed among three types of components: centralized units (CUs) for L3 operations, distributed units (DUs) used for L2 operations and optionally for some L1 operations, and radio units (RUs) used for at least a subset of L1 operations. L1 is also referred to as the physical layer (PHY). L2 comprises the MAC (Medium Access Control) and RLC (Radio Link Control) sub-layers. L3 may include sub-layers for PDCP (Packet Data Convergence Protocol) and SDAP (Service Data Adaptation Protocol). Operations of user plane 301 may include quality of service (QoS) Management 302 and Compression Integrity Ciphering 304 in L3, Automatic Repeat Request (ARQ) processing 306 and Hybrid ARQ (HARQ) processing 308 in L2, and Channel Coding 310 at the PHY layer. Operations of control plane 351 may include Non-access Stratum (NAS) 320 protocol tasks, System Information (SI) 322 tasks, Paging 324, Radio Resource Control (RRC) 326 and Compression Integrity Ciphering 328 in L3, ARQ 330 and HARQ 332 in L2, and Channel Coding 334 in the PHY layer. At least some of the layers and protocols shown in FIG. 3 may comprise the execution of respective sets of network functions. In at least some embodiments, a subset of the network functions corresponding to L1, L2 and/or L3 may be implemented using NFAs of the kind introduced above, incorporated within virtualization management offloading cards.

Figure 4:
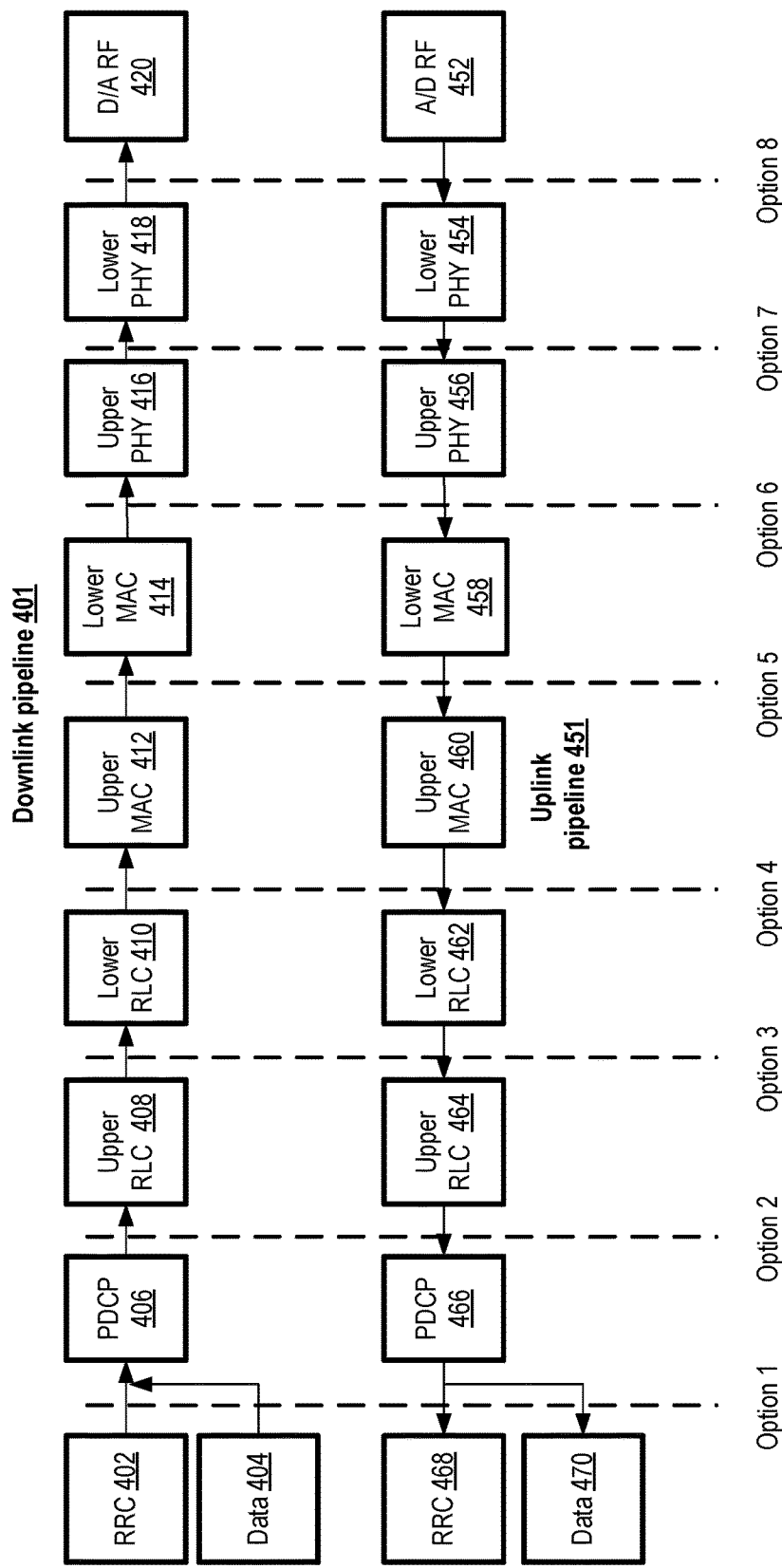
FIG. 4 illustrates example uplink and downlink pipelines of network functions for radio-based applications, according to at least some embodiments.

FIG. 4 illustrates example uplink and downlink pipelines of network functions for radio-based applications, according to at least some embodiments. Standards organizations have define several options for splitting the functions of the pipelines among the CUs (Centralized Units) and DUs (Distributed Units), which are indicated by the dashed line labeled Option 1, Option 2, . . . , Option 8 in FIG. 4. Such splits make it possible to distribute the workload for radio-based applications across several different devices, instead of relying on monolithic devices responsible for performing all the functions. Several more detailed options for splitting physical layer functionality among CUs and DUs, referred to as Options 7-1, Option 7-2 etc. as they are variations based on Option 7, are shown in FIG. 5.

The downlink pipeline 401 starts with RRC (Radio Resource Control) 402 and Data 404 and ends with digital to analog radio frequency (D/A RF) operations 420. In between, the downlink pipeline includes, in sequence, respective sets of network functions for PDCP (Packet Data Convergence Protocol) 406, Upper RLC (Radio Link Control) 408, Lower RLC 410, Upper Medium Access Control (MAC) 412, Lower MAC 414, Upper PHY (physical layer) 416, and Lower PHY 418. The uplink pipeline 451 starts with analog-to-digital radio frequency (A/D RF) operations 452, and ends with RRC 468 and Data 470. In between, network functions are executed in sequence for Lower PHY 454, Upper PHY 456, Lower MAC 458, Upper MAC 460, Lower RLC 462, Upper RLC 464, and PDCP 466. In various embodiments, at least some network functions of the Upper PHY and/or Lower PHY layers (for uplink and/or downlink) may be implemented using NFAs of the kind discussed above. In some embodiments, network functions of the other layers shown in FIG. 4 may also be implemented at the NFAs. In at least some embodiments, network functions of the RLC and MAC layers may be implemented using software running within radio-optimized compute instances (RCIs) of the kind shown in FIG. 1.

Figure 5:
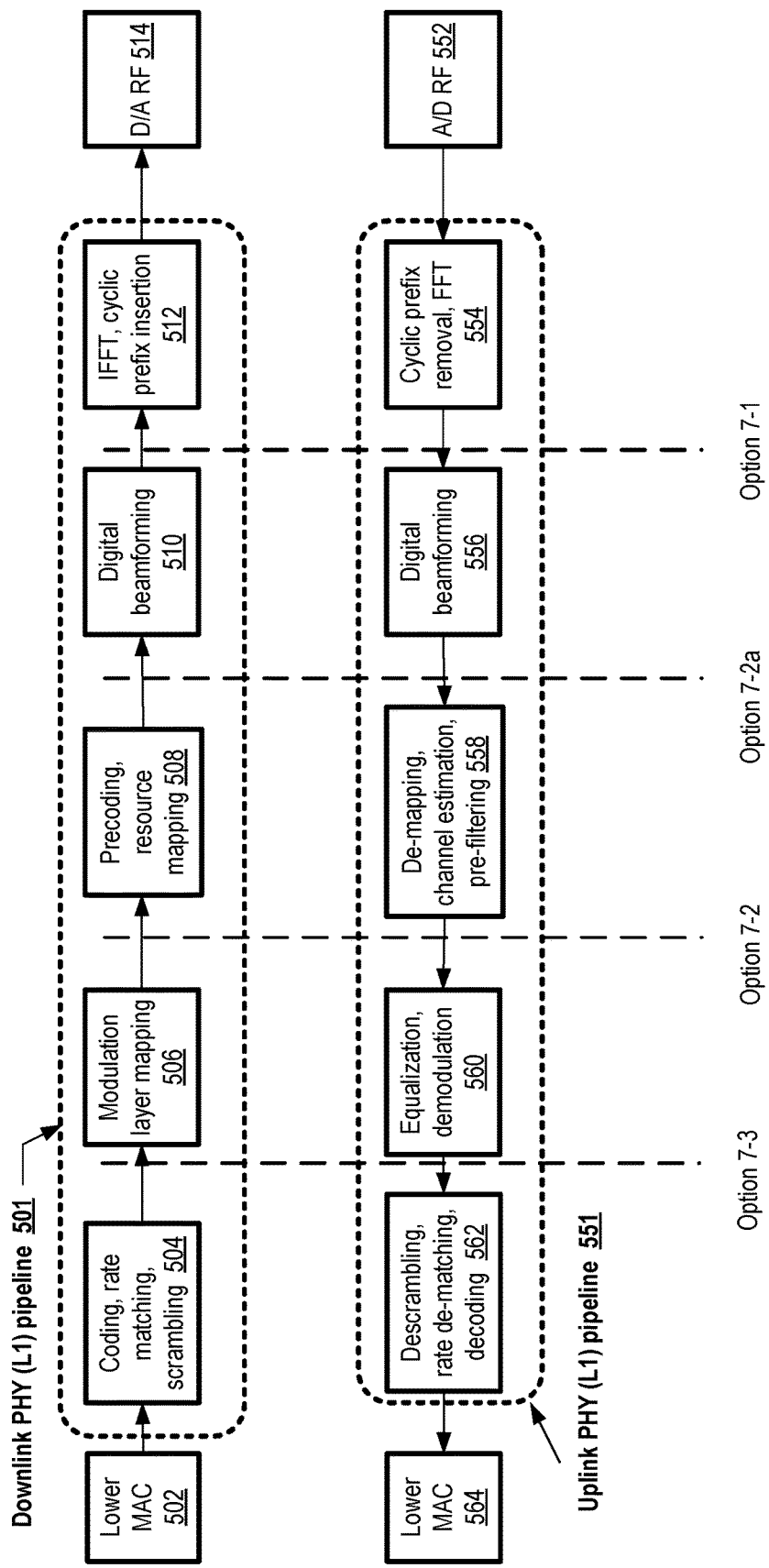
FIG. 5 illustrates example network functions which may be performed at a physical layer of a radio-based technology stack, according to at least some embodiments.

FIG. 5 illustrates example network functions which may be performed at a physical layer of a radio-based application technology stack, according to at least some embodiments. In the downlink PHY (L1) pipeline 501, in which control and data messages are being sent from higher-layer components towards the RUs, the lower MAC stage 502 (which is part of L2) leads to a coding, rate matching and scrambling stage 504, followed by a modulation layer mapping stage 506. This is followed by a precoding and resource mapping stage 508, a digital beamforming stage 510, and an inverse Fast Fourier Transform (IFFT) and cyclic prefix insertion stage 512 before the digital to analog radio frequency (D/A RF) operations 514 are performed. In the reverse direction, when control signals and data are flowing from the radio units towards the L3 components of the pipeline, an analog-to-digital radio frequency operations (A/D RF) stage 552 is followed by cyclic prefix removal and Fast Fourier Transform (FFT) stage 554 of the uplink PHY (L1) pipeline. This is followed by another digital beamforming stage 556, a de-mapping, channel estimation and pre-filtering stage 558, an equalization and demodulation stage 560, and a descrambling, rate de-matching and decoding stage 562 before the Lower MAC stage 564 of L2 is reached.

Each of the stages in the uplink and downlink pipelines 501 and 551 may require a respective set of network functions to be executed. The split options 7-3, 7-2, 7-2a and 7-1 represent respective proposals for distributing the overall combination of network functions between "upper L1" (implemented at DUs) and "lower L1" (implemented at RUs). The stages of pipelines 501 and 551 to the left of a dashed line indicating a split option are considered part of the upper L1, while the stages to the right are considered part of the lower L1. Thus, in the 7-2 split, stages 508, 510, 512, 554, 556 and 558 may be the responsibility of the RUs, with the remaining stages being the responsibility of DUs. In various embodiments, the network function accelerators utilized at radio-based pipeline processing servers (RPSs) may execute network functions of at least some of the pipeline stages shown in FIG. 5 using custom chipsets. For example, network functions implemented at an accelerator may include one or more L1 network functions of a radio-based technology stack, such as (among others): a coding function, a rate matching function, a scrambling function, a modulation layer mapping function, a precoding function, a resource mapping function, a digital beamforming function, a Fast Fourier Transform (FFT) function, a cyclic prefix insertion function, a cyclic prefix removal function, an inverse FFT function, a de-mapping function, a channel estimation function, a pre-filtering function, an equalization function, a demodulation function, a descrambling function, a rate de-matching function, or a decoding function. In at least some embodiments, the network function accelerators may implement DU functionality. In some embodiments, at least a portion of CU functionality may be implemented at RPSs in addition to DU functionality.

Figure 6:
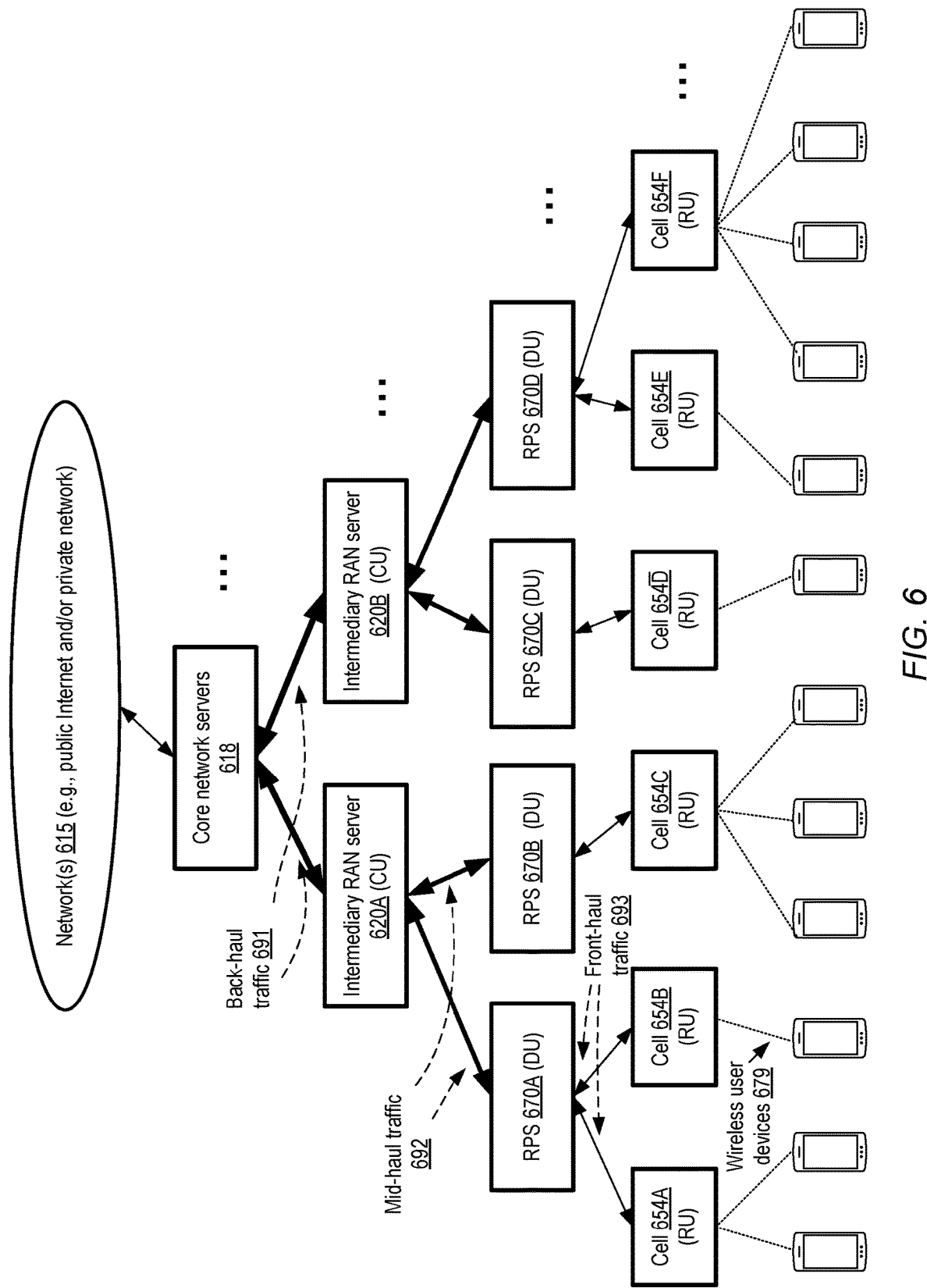
FIG. 6 illustrates an example hierarchy of devices which may be used for radio-based applications, according to at least some embodiments.

FIG. 6 illustrates an example hierarchy of devices which may be used for radio-based applications, according to at least some embodiments. In the depicted embodiment, core network servers 618, linked to one or more networks 615 used to transfer the Internet Protocol packets comprising the payloads and control signals of the applications over large distances, may implement a set of back-end functions associated with radio-based applications, enabling different sub-networks of the overall system to communicate with one another. Network functions performed at the core network servers (referred to as core network functions) may for example include functions to aggregate data traffic from end user devices, authenticate subscribers, apply personalized policies, and/or manage the mobility of devices prior to routing traffic to operator services or the Internet. A given core network server 618 may, for example, be located at a provider network data center in one embodiment. The core network server may be connected to one or more intermediary RAN servers 620, such as 620A and 620B in some embodiments, at which additional central unit (CU) functionality may be implemented. The traffic between the core network servers 618 and the Intermediary RAN servers 620 may be referred to as back-haul traffic 691 in the depicted embodiment. An intermediary RAN server may, for example, be located within a premise at which one or more VCS extension sites are implemented, or at a premise which is located close to such extension sites.

In the embodiment depicted in FIG. 6, distributed unit (DU) functionality of the radio-based application technology stack may be implemented at RPSs 670 (similar in functionality to virtualization servers 150 and 152 of FIG. 1). Each intermediary RAN server 620 may be linked to one or more RPSs—e.g., intermediary RAN server 620A may be connected to RPS 670A and RPS 670B, while intermediary RAN server 620B may be linked to RPS 670C and RPS 670D. The traffic between CUs and DUs may be referred to as mid-haul traffic 692 in various embodiments. Each of the RPSs in turn may be linked, e.g., using NHDs incorporated within virtualization management offloading cards, with radio units (RUs) at devices of one or more cells 654. For example, RPS 670A may be linked to radio units at cell 654A and 654B, RPS 670B may be linked to radio units at cell 654C, RPS 670C may be linked to radio units at cell 654D, and RPS 670D may be linked to radio units at cell 654E and 654F. The traffic between DUs and RUs may be referred to as front-haul traffic 693. Each of the cells may comprise one or more antennas which can be used to receive and transmit radio frequency signals from a variety of wireless user devices 679. A given RAN node (such as a gNodeB in the case of 5G applications) may comprise one or more CUs, one or more DUs and one or more RUs in various embodiments. In some embodiments, RPSs, intermediary RAN servers, and core servers may all be implemented at least in part using provider network resources. According to one embodiment, an RPS may be used to run at least some core network functions (the functions run at the core servers 618). In one embodiment, at least some of the functionality of the cells 654 may also be implemented using provider network resources. In at least one embodiment, RPSs may also be used to implement at least a subset of CU functionality.

Figure 7:
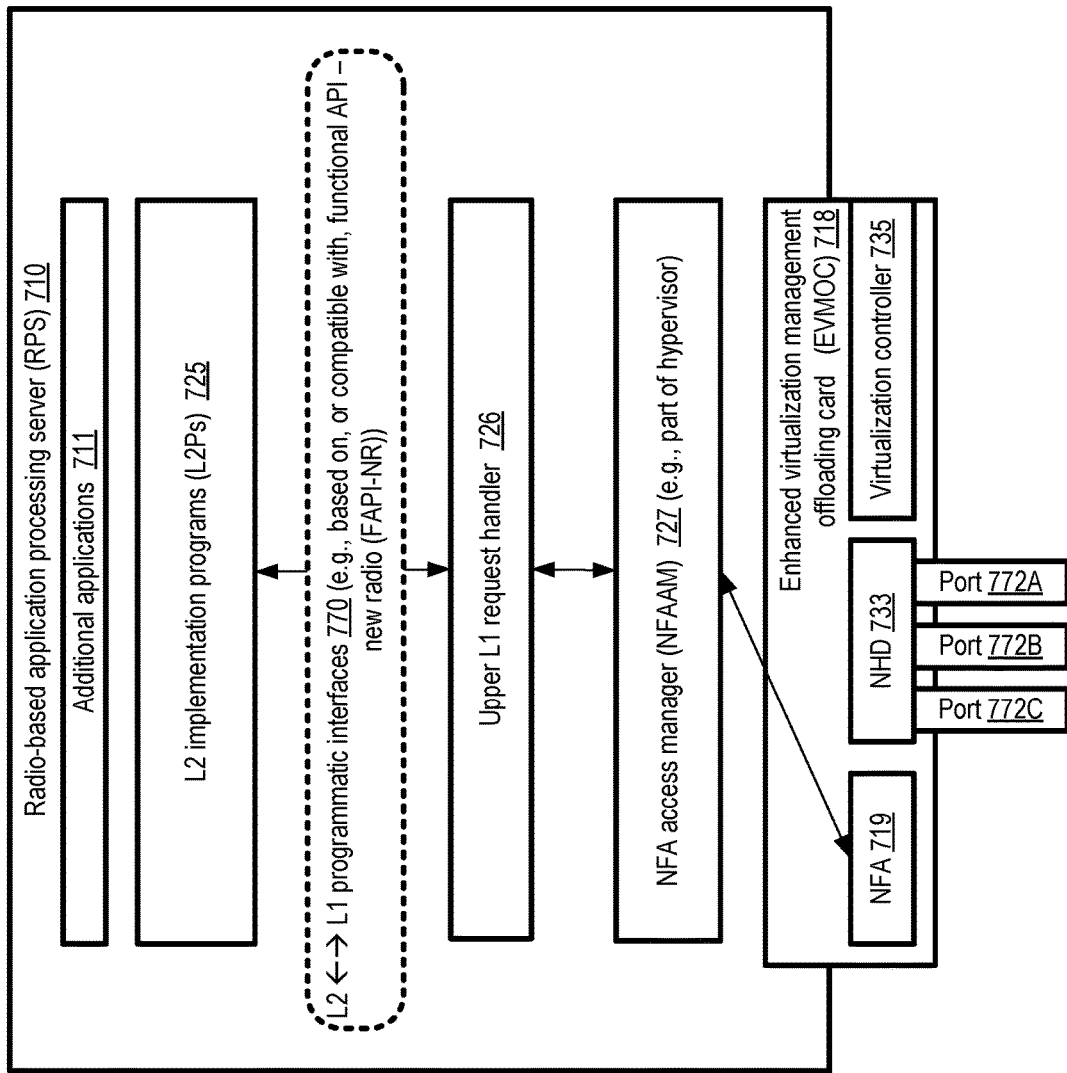
FIG. 7 illustrates example deployments of L2 implementation programs of a radio-based technology stack at a radio-based application processing server, according to at least some embodiments.

FIG. 7 illustrates example deployments of L2 implementation programs of a radio-based technology stack at a radio-based application processing server, according to at least some embodiments. In the depicted embodiment, a radio-based application processing server (RPS) 710 comprises a set of programs for the L2 layer, L2Ps 725, of one or more radio-based application (RBA) pipelines. L2Ps 725 may have been developed by a third-party vendor or software provider in some embodiments, or by the provider network operator. In at least some embodiments, L2Ps of an RBA pipeline may be launched within a compute instance (such as a radio-optimized compute instance similar to RCI 125A or 125B of FIG. 1).

In the embodiment depicted in FIG. 7, a request handler may be launched at the RPS for the RBA pipeline. Upper L1 request handler 726 may be used for processing/forwarding requests generated at L2Ps 725 for network functions. In embodiments in which the RPS is being used in multi-tenant mode for multiple RBA pipelines, a respective upper L1 request handler and a set of L2Ps may be instantiated for each of the pipelines. The request handlers may be isolated from one another in respective runtime environments, e.g., as part of respective compute instances or software containers with address spaces that cannot be accessed from other execution environments. In some embodiments, a request handler 726 may comprise one or more privileged threads or processes, running within the same runtime environment as their corresponding L2Ps. Each of the request handlers 726 may comprise software developed at the provider network in the depicted embodiment, e.g., as opposed to the L2Ps which may have been developed by entities other than the provider network operator.

A request handler 726 may receive requests for upper L1 network functions from L2Ps 725 for the downlink portions of the RBA pipeline, e.g., via a set of L2↔L1 programmatic interfaces 770 designed and implemented at the provider network in some embodiments. The programmatic interfaces 770 may, for example, be based on, or compatible with a standard such as FAPI-NR (functional API-new radio) in at least some embodiments. In one embodiment, the programmatic interfaces 770 may be published or otherwise communicated by the provider network to external organizations, thus enabling vendors of L2Ps to develop code which can be used with the RPS upper L1 request handlers. Note that the number of L2Ps and request handlers executed at a given RPS 710 may vary, e.g., based on the number of provider network clients which wish to implement their radio-based applications in the same vicinity; for example, more than two L2Ps and corresponding request handlers may be launched at an RPS, or a single L2P and a single request handler may be launched. In some embodiments, APIs of a different boundary layer of a radio-based technology stack (i.e., not necessarily the L2-L1 interface) may be implemented by request handlers.

An NFA access manager (NFAAM) 727 (also referred to as a network function offloading manager) may be launched at the RPS 710 in at least some embodiments, e.g., as part of a virtualization management component such as a hypervisor. The NFAAM 727 may act as an intermediary between the request handlers and a set of network function accelerators (NFAs) such as NFA 719 implemented at enhanced virtualization management offloading card (EVMOC) 718 of the RPS 710 in the depicted embodiment, e.g., in a manner somewhat analogous to the way that hypervisors and other virtualization management components at a general-purpose virtualization host or server can act as intermediaries between software and other hardware components.

The NFAAM may receive L1 network function requests sent from the request handler 726 for all the downlink pipelines being implemented using RPS 710, determine the particular NFA 719 (if there are multiple NFAs) which should be utilized for a given network function, and transmit the request to that NFA for execution in the depicted embodiment. The results of the execution of a network function may be transmitted to one or more radio units of one or more cells from the NFA in some embodiments. For messages flowing from the antennas towards the L2 and L3 layers of the application pipelines (uplink pipeline messages), the workflow may be reversed—the incoming messages may be transmitted to an NFA from the RUs, one or more network functions may be executed at the NFA, and the results may be forwarded via the NFAAM and/or the request handlers to the L2Ps. The L2Ps may then transfer the results of L2 processing further up the stack, e.g., to L3 or CU implementation programs at other RPSs, intermediary RAN servers and/or at core servers.

The NFAAM may include a metrics/health state information collector in at least some embodiments, which keeps track of the resource utilization levels of the NFAs (e.g., including utilization levels of on-card processors, memory and the like), failures (if any) of NFA components, latencies for completing network function processing at NFAs, and so on. Such metrics may be provided to control plane servers of the VCS and used to make various configuration decisions, such as which particular NHD or NFA should be used for a given type of network communication or network function, RBA workload migration decisions, whether a given network function should be executed locally or transmitted for remote execution to another server, and so on in different embodiments.

RPS 710 may comprise one or more NHDs 733 implemented as part of EVMOC 718 in the depicted embodiment. In embodiments in which the RPS comprises multiple NHDs, a networking manager of the RPS (not shown in FIG. 7) may be responsible for selecting the particular NHD to be used for traffic directed to a particular category of destination in various embodiments. A given NHD may comprise several different ports, such as ports 772A, 772B and 772C in the depicted embodiment, which enable connectivity to be established with several different network endpoints or networking devices such as routers/switches using that NHD. In some embodiments, one NHD or port may be used for communications with RUs (front-haul traffic), while another NHD or port may be used for mid-haul traffic or back-haul traffic. EVMOC 718 may also include a virtualization controller 735, similar in functionality to virtualization controller 215 of FIG. 2.

In embodiments in which the EVMOC includes multiple NFAs, the specific NFA for a given request may be selected (e.g., by the NFAAM) based on any combination of a variety of factors in different embodiments. For example, in some embodiments, a given L2P may be associated with at least one NFA at the request of the client on whose behalf the L2P is run, so the NFA selected for a given network function request may be based at least in part on the L2P from which that network function was requested. In some cases, a given NFA may be assigned for exclusive use on behalf of a given radio-based application or a given client of the provider network. Metrics collected from the NFAs could be used to select the NFA to which a given network function request is directed in some embodiments, e.g., the NFA with the lowest recent resource utilization levels may be selected in preference to other NFACs.

Each of the radio-based applications whose pipelines are being executed at the RPS may belong to one of a set of application areas with respective expectations regarding performance and other quality of service considerations in the depicted embodiment. The ITU-R (International Telecommunication Union-Radiocommunication sector) standards organization has defined at least three such application areas for 5G cellular communication: enhanced mobile broadband (eMBB), massive machine-type communications (mMTC), ultra-reliable and Low Latency Communications (URLLC). An NFA may be selected for at least some of the network functions of an application by the NFAAM based on the application area to which the application belongs in some embodiments.

The RPS may also be used for one or more additional applications 711 on behalf of one or more clients, such as applications that do not require the execution of L1 and L2 network functions. As a result of offloading at least some of the L1 network function workload to NFAs, more of the primary processors (CPUs, GPUs etc.) of the RPS may become available for such additional applications in various embodiments.

In various embodiments, RPSs similar to RPS 710 may provide an implementation of Open Radio Access Network (O-RAN), a disaggregated approach to deploying mobile front-haul and mid-haul networks built on cloud native principles. O-RAN is an evolution of the Next Generation RAN (NG-RAN) architecture, first introduced by the 3GPP. Organizations such as the O-RAN Alliance have developed standards for O-RAN, and the RPSs may be designed to comply with such standards in at least some embodiments.

Figure 8:
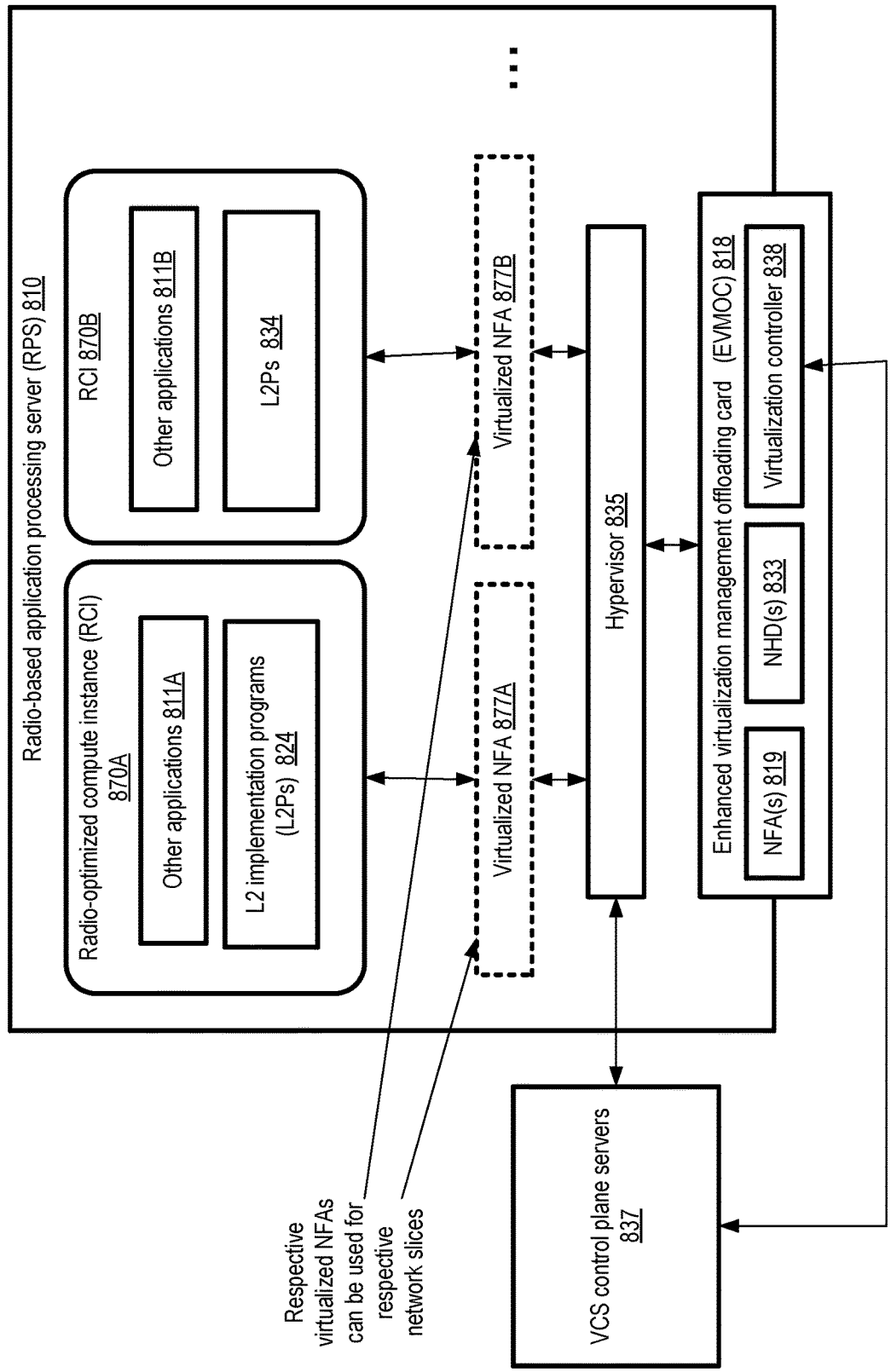
FIG. 8 illustrates an example presentation of virtualized representations of a hardware network function accelerator to compute instances running at a virtualization server, according to at least some embodiments.

FIG. 8 illustrates an example presentation of virtualized representations of a hardware network function accelerator to compute instances running at a virtualization server, according to at least some embodiments. In the embodiment depicted in FIG. 8, an RPS 810 may be used to run at least two radio-optimized compute instances (RCIs) 870A and 870B. Each RCI may comprise a set of L2 implementation programs of respective RBAs, such as L2Ps 824 of RCI 870A and L2Ps 834 of RCI 870B. Other applications 811A (i.e., applications that do not implement L2 network functions) may also be run at RCI 870A, and other applications 811B may similarly be run at RCI 870B.

The RPS 810 may comprise a hypervisor 835 and an EVMOC 818 in the depicted embodiment. The EVMOC 818 may include at least one NFA 819, at least one NHD 833 and a virtualization controller 838 of the kind discussed above. The virtualization controller and the hypervisor may communicate with one or more VCS control plane servers 837, e.g., using one of the NHDs 833.

In at least some embodiments in which one or more RCIs are run at an RPS, respective virtualized representations of an NFA may be presented programmatically to each of the RCIs by the hypervisor or other virtualization management components. For example, virtualized NFA 877A may be presented to RCI 870A, and virtualized NFA 877B may be presented to RCI 870B. From the perspective of any given RCI, the virtualized representation may grant access to all the functionality that would have been provided had the RCI been granted access to the physical NFA, in a manner analogous to the way in which a virtualized CPU may appear to grant access to a physical CPU. A set of APIs for issuing requests/commands to the NFA may be included in the virtualized representations. To cause a given network function to be executed at the NFA, a program running at an RCI may invoke an API of the virtualized representation provided to that RCI. Respective virtualized NFAs may be used for respective network slices, enabling multiple RBA or RBA pipelines to be implemented using a shared hardware NFA in the depicted embodiment.

In some implementations, the hypervisor may maintain a data structure comprising a number of slots in some embodiments, with each slot representing a respective virtualized view of at least a portion of the computing and/or networking capacity of an NFA, which can be allocated or assigned to a particular RBA or L2P for at least some time period. Individual slots may comprise elements in an array, linked-list, or other similar data structure in some embodiments. In various embodiments, the hypervisor may schedule the execution of individual network functions from multiple pipelines (i.e., different radio-based applications) at a shared NFA in such a way that from the perspective of any given pipeline, it appears that the NFA is being used exclusively for that pipeline. In some embodiments, the number of slots maintained by the hypervisor for a given NFA may be based at least in part on the total performance capacity of the NFA along one or more dimensions, such as the network function processing capacity of the NFA, the network bandwidth available for communicating with RUs from the NFA, and so on.

Figure 9:
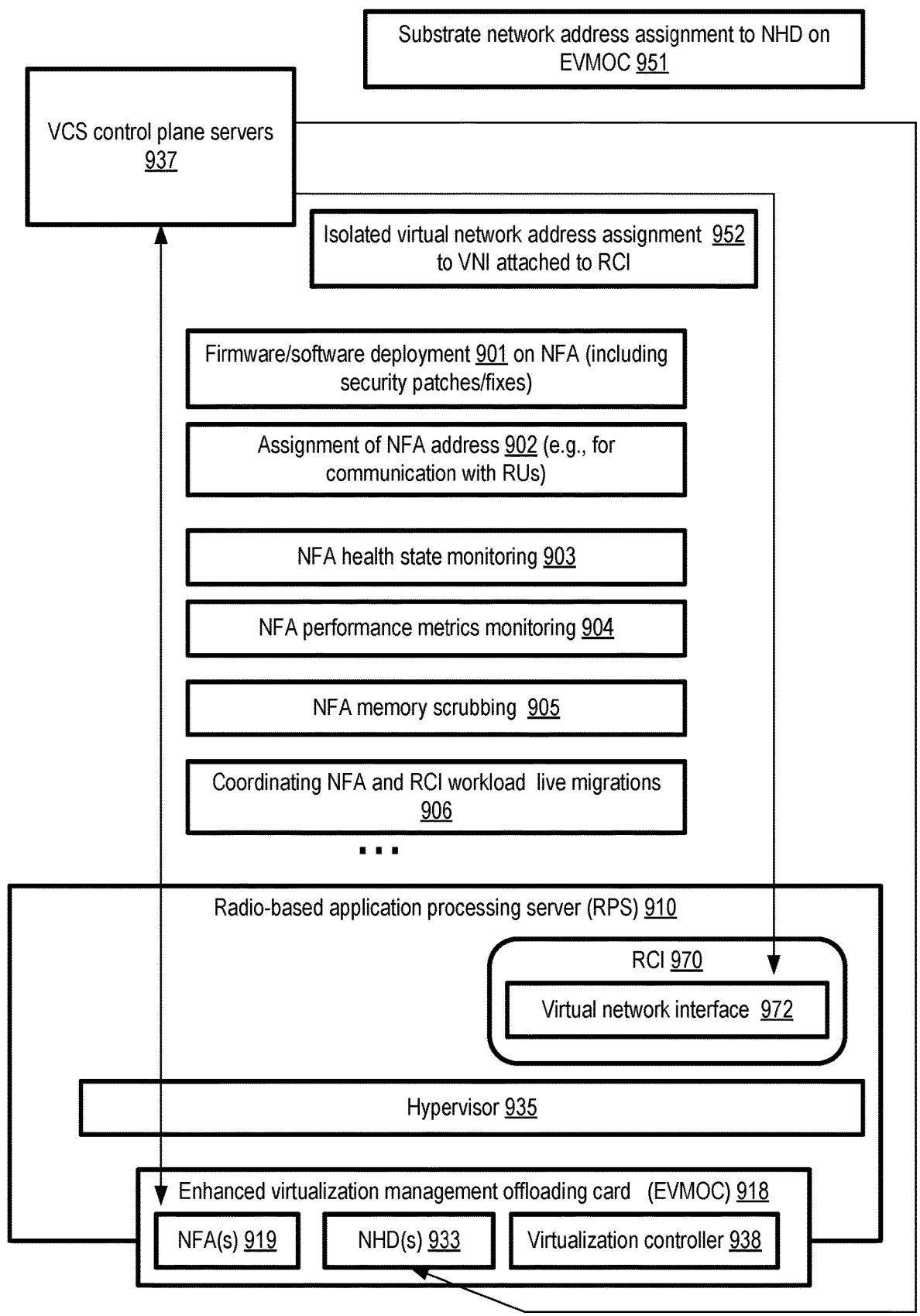
FIG. 9 illustrates example network function accelerator configuration management tasks which may be performed by or initiated by control plane servers of a virtualized computing service, according to at least some embodiments.

FIG. 9 illustrates example network function accelerator configuration management tasks which may be performed by or initiated by control plane servers of a virtualized computing service, according to at least some embodiments. In the embodiment depicted in FIG. 9, an RPS 910 may be used to run at least one radio-optimized compute instances (RCI) 970. The RCI may comprise a set of L2 implementation programs of respective RBAs, similar to the L2Ps discussed earlier in the context of FIG. 7 and FIG. 8. Other applications may also be run at RCI 970.

The RPS 910 may comprise a hypervisor 935 and an EVMOC 918 in the depicted embodiment. The EVMOC 918 may include at least one NFA 919, at least one NHD 933 and a virtualization controller 938 of the kind discussed above. The virtualization controller and the hypervisor may communicate with one or more VCS control plane servers 937, e.g., using one of the NHDs 933.

The VCS control plane servers may perform several types of administration and configuration tasks associated with an NFA 919 in the depicted embodiment, e.g., with the help of the hypervisor and/or the virtualization controller. These tasks may include firmware/software deployment 901 of the FSA, including the installation of an initial version of the firmware/software and any subsequent versions or updates that become available. As part of the firmware/software management, security patches or fixes may be applied to the NFAs in various embodiments. In an embodiment in which the NFA firmware/software is prepared by a third-party vendor, for example, rather than by the operator of the provider network, the VCS control plane servers may implement programmatic interfaces that can be used by the third-party vendor to submit the firmware/software to the VCS, and the VCS control plane servers may then propagate the firmware/software to the appropriate RPSs.

In at least some embodiments, the VCS control plane servers may assign network addresses to be used for communications between the NFAs and other components of RBAs, such as RUs and/or CUs. The assignment of an NFA address 902 may be done in response to a programmatic request from the VCS client on whose behalf the NFA is going to be used in some embodiments—e.g., the client may indicate the specific address or let the VCS control plane servers select the address. In some cases, one address may be assigned for front-haul traffic of an RBA being implemented with the help of the RPS, while another address may be assigned for mid-haul traffic. In at least one embodiment, an address within an IVN set up at the request of the client may be assigned to an NFA.

In various embodiments, the NFA may comprise its own processors and memory. The memory may be used to store data pertaining to the network functions being executed at the NFA, such as intermediate or final results of the network functions, and so on. In one such embodiment, the VCS control plane servers may scrub or clean the memory at one or more points in time, such as when an RCI which was sending requests for network functions to the NFA is terminated. Such NFA memory scrubbing 905 may help enhance the security of the RBAs run using the RPS, as data generated or stored in NFA memory for one RBA may be permanently scrubbed or deleted before any other RBA can access it.

VCS control pane servers may also be responsible for NFA health state monitoring 903 and NFA performance metrics monitoring 904 in the depicted embodiment. Information about the health status of the NFA and the performance characteristics of the NFA during various time intervals may be provided to the client on whose behalf the NFA is being used (e.g., an RBA owner) via programmatic interfaces in various embodiments. Metrics collected and presented by the control plane may include, for example, utilization levels of NFA processors, memory and the like, rates or counts of failures or errors (if any) of NFA components, latencies for completing network function processing at NFAs, and so on.

The VCS control plane servers may also be responsible for coordinating NFA and RCI workload live migrations 906 in some embodiments. Such live migrations may be initiated based on a variety of triggering conditions, such as the availability of new versions of L2Ps, detection that a count of errors of failures at the RPS has exceeded a threshold, and so on. As a result of a live migration, RBA traffic from an RU that was earlier sending messages to the NFA at one RPS (the migration source RPS) may be directed to an NFA at a different RPS (the migration destination RPS), and network functions that were being run at an RCI of the migration source RPS may be run instead at a migrated version of the RCI at the migration destination RPS. The control plane servers may ensure that state information of the RBA, including NFA state information as well as RCI state information, is replicated at the migration destination RPS from the migration source RPS without disrupting ongoing RBA operations in various embodiments.

VCS control plane servers may also be responsible for substrate network address assignment to an NHD on the EVMOC 951, and for isolated virtual network address assignment 952 to a virtual network interface 972 programmatically attached to an RCI 970 in the depicted embodiment. An encapsulation protocol implemented at the VCS and mappings between substrate addresses and IVN addresses may be used for communications between the RCI and entities external to the RPS in various embodiments.

Figure 10:
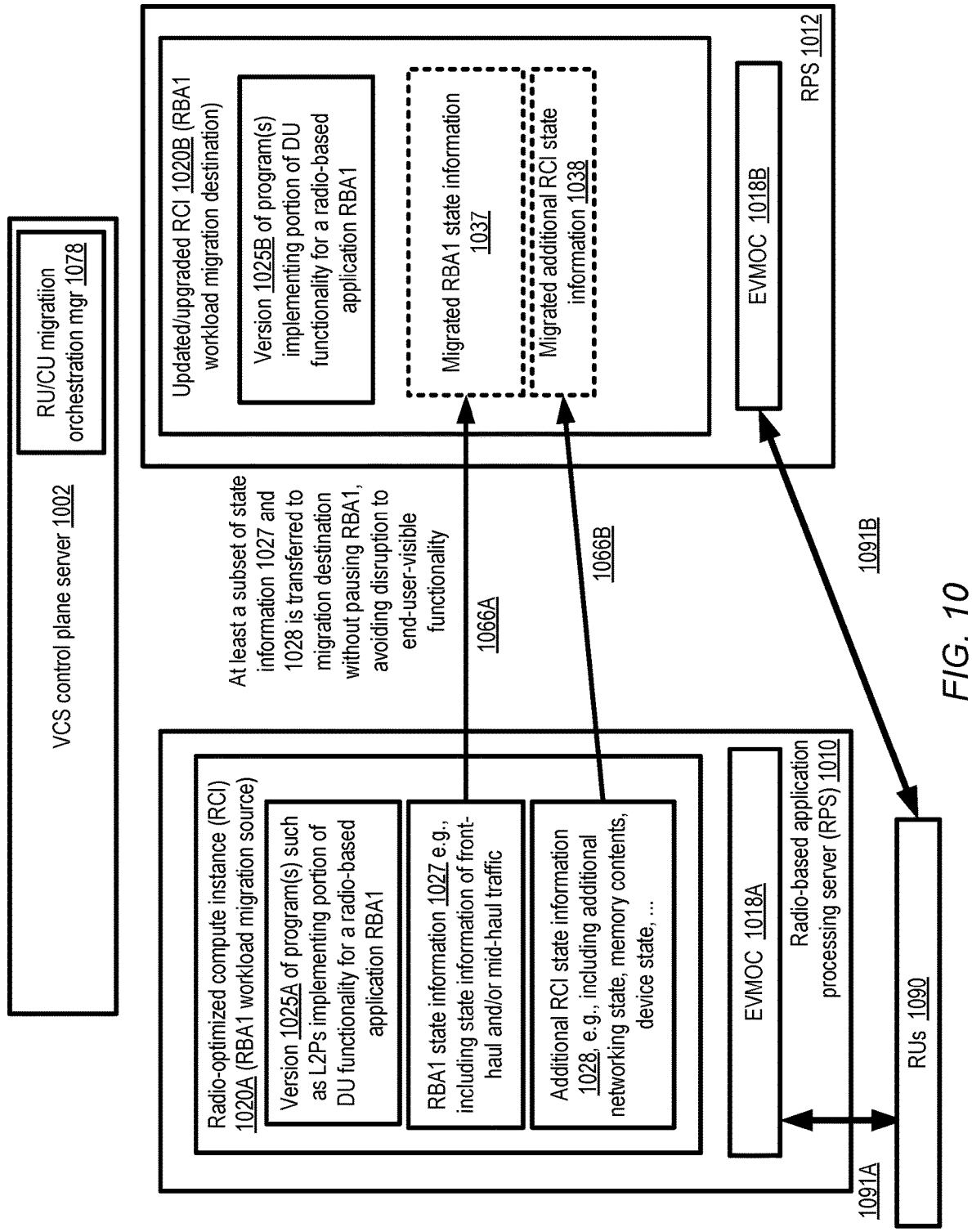
FIG. 10 illustrates aspects of a workload migration technique that may be employed for radio-based applications, according to at least some embodiments.

FIG. 10 illustrates aspects of a workload migration technique that may be employed for radio-based applications, according to at least some embodiments. In the example scenario depicted in FIG. 10, an RCI 1020A may be instantiated at an RPS 1010 equipped with an EVMOC 1018A which includes an NFA of the kind discussed above. The RCI 1020A may comprise a version 1025A of one or more programs (such as an L2 implementation program or L2P) which perform part of the DU (distributed unit) functionality of a radio-based application RBA1. RBA1 may include other layers as well, such as a centralized unit (CU) layer and an RU layer, which may be run on resources other than the RPS 1010. In order to implement the DU functionality, state information pertaining to messages or traffic between pairs of layers of RBA1 may be maintained at the RCI and accessed by the version 1025A of the programs. Such RBA1 state information 1027 may include, for example, state information pertaining to front-haul traffic (DU-RU traffic) as well as mid-haul traffic (DU-CU traffic) in the depicted embodiment.

A VCS control plane server 1002 of the VCS may be responsible for detecting triggering conditions for migrating the RBA1 workload that was initially run at RCI 1020A to another RCI 1020B in the depicted embodiment. One or more control plane agents used for migration may run locally at the RPS 1010 in some embodiments, e.g., as part of a virtualization management layer or as part of RCI 1020A. Any of a variety of triggering conditions may lead to a migration in different embodiments, such as a receipt of a programmatic request to upgrade the programs implementing L2 or DU functionality, performance metrics, detection of errors at the RPS 1010, and so on.

In the embodiment depicted in FIG. 10, a determination may be made by the VCS control plane server 1002 that at least a subset of the operations of RBA1 are to be migrated to an updated/upgraded RCI 1020B. RCI 1020A may be referred to as the RBA1 workload migration source, and RCI 1020B may be referred to as the RBA1 workload migration destination (or a migrated version of RCI 1020A) in the depicted embodiment. In FIG. 10, RCI 1020B runs at a different RPS 1012 than RCI 1020A; RPS 1010 may be referred to as the migration source RPS, while RPS 1012 may be referred to as the migration destination RPS. RCI 1020B may include a version 1025B of the programs implementing DU functionality of RBA1. Version 1025B may comprise an updated/upgraded version of the DU implementation programs (whose earlier version was version 1025A) in the depicted embodiment.

In response to the determination that RBA1's workload is to be migrated, state information that is needed to run the RBA DU operations at RCI 1020B may be transferred to RCI 1020B in various embodiments. At least a subset of state information 1027A of the mid-haul and/or front-haul traffic of RBA1 may be transferred to RCI 1020A without pausing RBA1, as indicated by arrow 1066A in the depicted embodiment. Similarly, in various embodiments, at least a subset of additional RCI state information 1028 (such as networking state information pertaining to traffic categories other than front-haul or mid-haul traffic, memory contents, device state information and the like) may also be transmitted to RCI 1020B without pausing RBA1 or other applications running at RCI 1020A, as indicated by arrow 1066B. This type of state transfer, which may involve multiple iterations in which incremental portions of state information which have been modified since the last iteration are transferred, may help to avoid disruptions to end-user-visible functionality of RBA1 and/or other applications which were run initially at RPS 1010. Eventually, after all the state information that can be transferred without pausing RBA1 has been sent to RCI 1020B, RBA1 may be paused briefly to transfer any remaining state information in the depicted embodiment. After the state information has been fully transferred, operations of RBA1's DU may be initiated at updated/upgraded RCI 1020B, where they may resume DU functionality using migrated RBA1 state information 1037 in the depicted embodiment. Migrated additional RCI state information 1038 may be used to resume other operations which were earlier run at RCI 1020A in the depicted embodiment.

In various embodiments, a VCS control plane server 1002 may include one or more orchestration managers, such as RU/CU orchestration manager 1078, responsible for coordinating the migration of DU functions with other components (such as CU layer components or RU layer components) of RBA1. For example, the other components may be notified via one or more messages regarding the pending migration of the DU, so that the other components can perform one or more preparatory operations (e.g., saving or backing up their own state information in case the migration fails for some reason). Front-haul traffic 1091A which was originally flowing between RUs 1090 and the NFA at EVMOC 1018A may, after the migration of state information is complete and the RUs are notified regarding the migration, flow between the RUs 1090 and the NFA at EVMOC 1018B at the RPS 1012 in the depicted embodiment as indicated by arrow 1091B. During the migration procedure, in some embodiments, routing components of the provider network may implement traffic mirroring so that messages being sent from RUs 1090 to the NFA at EVMOC 1018A are also sent to the NFA at EVMOC 1018B.

Figure 11:
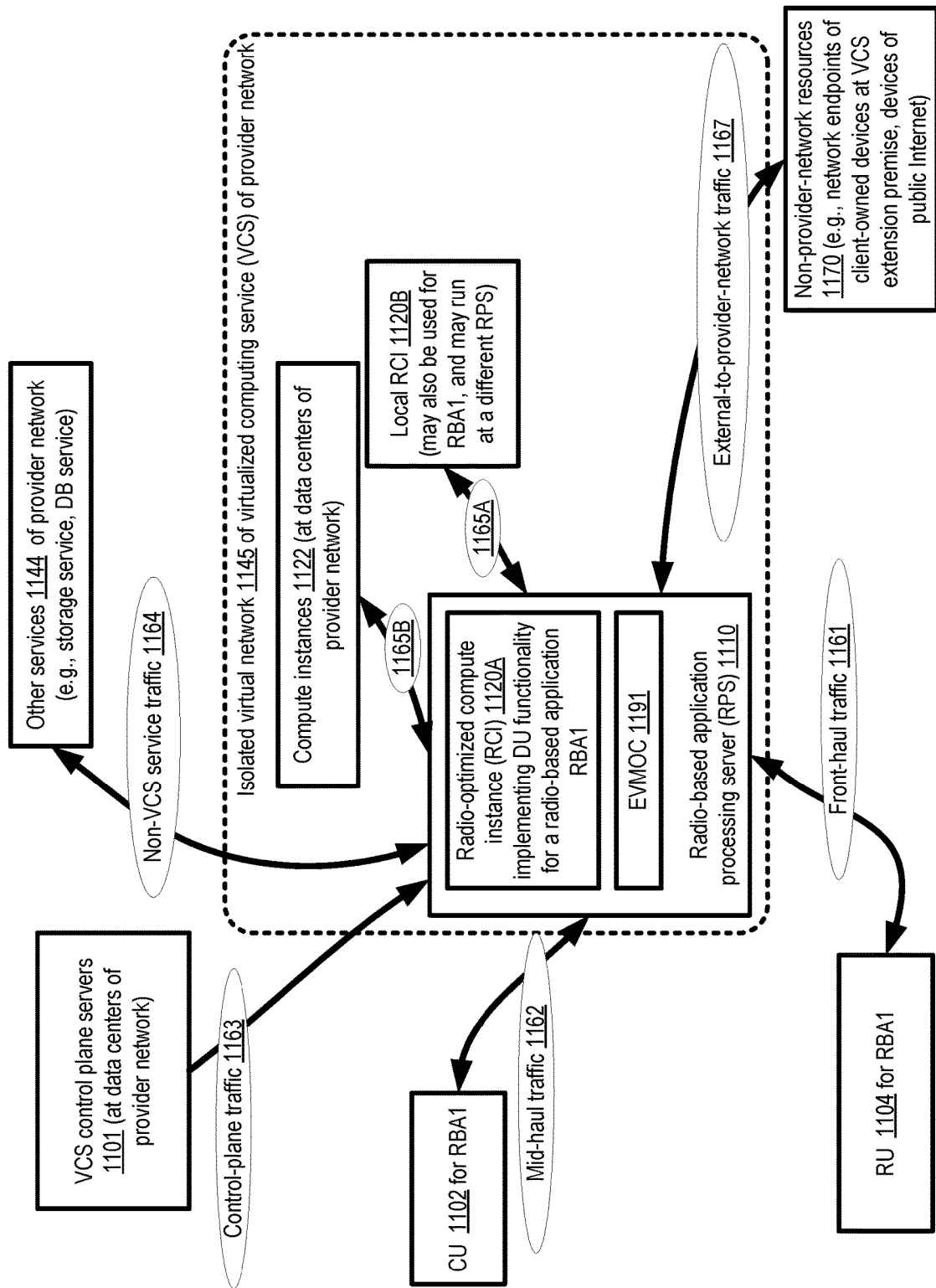
FIG. 11 illustrates example categories of network traffic of a radio-based application processing server, according to at least some embodiments.

FIG. 11 illustrates example categories of network traffic of a radio-based application processing server, according to at least some embodiments. An RPS 1110 may comprise an EVMOC 1191 (which includes one or more NFAs, one or more NHDs, and a virtualization controller) and an RCI 1120A at which at least a portion of DU functionality of a radio-based application RBA1 may be implemented. The RPS 1110 may be located at a premise external to the provider network data centers in the depicted embodiment, e.g., at a local zone or as part of a VCS extension resource group configured at a premise selected by a VCS client. RCI 1120A may be configured as a part of an isolated virtual network (IVN) 1145 of a VCS of the provider network in the depicted embodiment, e.g., by assigning an IP address of a range of IVN IP addresses to RCI 1120A. The IVN 1145 may comprise one or more other RCIs such as local RCI 1120B at the same premise as RPS 1110; RCI 1120B may, for example, also be used to perform some portion of RBA1. RCI 1120B may run at a different RPS than RPS 1110. IVN 1145 may also comprise one or more compute instances 1122 which run at virtualization servers within the provider network's data centers in the scenario depicted in FIG. 11. In addition, in some cases IVN 1145 may include one or more other local compute instances which are not optimized for radio-based applications but are also run at the same premise as RPS 1110. Each of the compute instances within IVN 1145, including instances 1122, 1120A and 1120B, may be assigned IP addresses within the range(s) of IP addresses selected for the IVN. For example, respective virtual network interfaces (VNIs) to which the IP addresses are assigned may be programmatically attached to the compute instances by VCS control plane servers, thereby in effect assigning the IP addresses to the compute instances.

RPS 1110 may participate in at least five categories of network traffic exchanges in the depicted embodiment. Front-haul traffic 1161 may flow between the NFA of EVMOC 1191 of RPS 1110 and one or more RUs of RBA1, such as RU 1104. Mid-haul traffic 1162 may flow between the RPS 1110 and one or more CUs of RBA1, such as CU 1102. Control-plane traffic 1163 (such as commands to configure the NFA, launch RCIs, terminate RCIs, or migrate RCI workloads) may be directed to RPS 1110 from VCS control-plane resources located at data centers of the provider network. Messages directed to or from other services 1144 of the provider network (such as a storage service or a database service) from applications run at the RPS 1110, may constitute non-VCS service traffic 1164 in the depicted embodiment. In some cases, the premise at which the RPS 1110 is configured may include one or more resources that are not managed by the provider network, such as client-owned devices or servers at which client applications other than RBA1 are run. Such resources may be referred to as one example of non-provider-network resources 1170; other examples may include devices of the public Internet. Traffic to/from network endpoints of such resources may be referred to as external-to-provider-network traffic 1167. The final category of network traffic, referred to as intra-IVN traffic, may include traffic 1165A between the RCI 1120A of the RPS and other local compute instances 1120B (intra-IVN traffic 1165A) and traffic between the RPS and compute instances 1122 within the provider network's data centers (intra-IVN traffic 1165B) in the depicted embodiment.

In some embodiments, as mentioned earlier, the EVMOC 1191 may comprise several networking hardware devices or NHDs, and respective NHDs may be selected (e.g., based on commands from control plane servers 1101 of the VCS) from among the set of NHDs for one or more of the categories of traffic shown in FIG. 11. For example, one NHD may be used for front-haul traffic, another for mid-haul traffic, and so on. Various networking related configuration settings (including settings related to network security_ of the IVN 1145, chosen for example by the client on whose behalf the IVN 1145, may be applied to mid-haul and front-haul traffic of RBA1 in some embodiments, in addition to being applied for other traffic of compute instances set up within the IVN.

Figure 12:
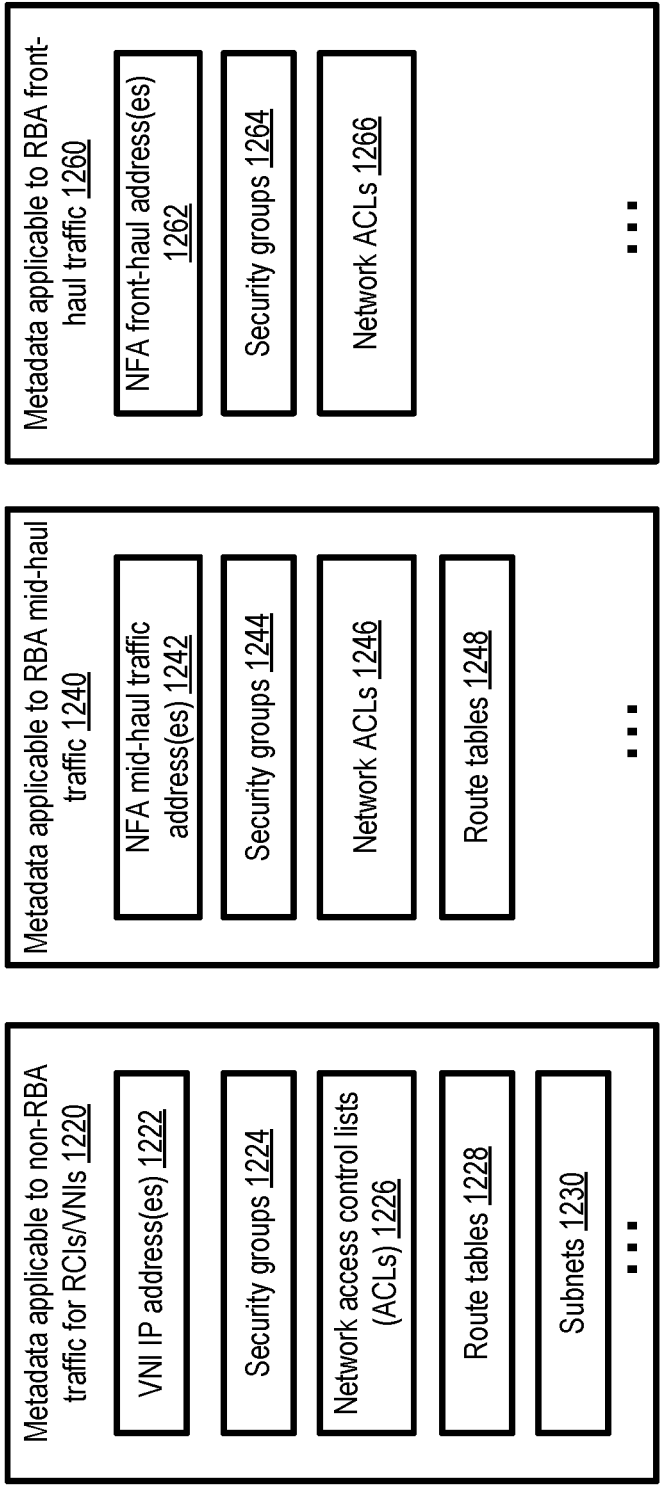
FIG. 12 illustrates example categories of isolated virtual network metadata associated with a radio-based application processing server, according to at least some embodiments.

Metadata pertaining to various aspects of isolated virtual networks may be stored by the VCS control plane in various embodiments. FIG. 12 illustrates example categories of isolated virtual network metadata associated with a radio-based application processing server, according to at least some embodiments. As shown, isolated virtual network metadata 1201 may include metadata applicable to non-RBA traffic for RCIs/VNIs 1220, metadata applicable to RBA mid-haul traffic 1240 and metadata applicable to RBA front-haul traffic.

Metadata 1220 may include, for example, VNI IP addresses 1222 (which can be used as source or destination addresses for packets originating at or directed to compute instances including RCIs), security groups 1224, network access control lists (ACLs) 1226, route tables 1228 and subnets 1230 in the depicted embodiment. Access controls (also known as security groups, network security groups, application security groups, cloud security groups, or compute engine firewalls rules, in various implementations) act as a virtual firewall for a compute instance to control inbound and outbound traffic. Customers can define security groups as policies that can be applied to specific instances. When a customer launches an instance in an IVN, they can assign one or more security groups to the instance. Security groups can act at the instance level, not the subnet level. Therefore, each instance in a subnet can be assigned to a different set of security groups. For each security group, the customer can add rules that control the inbound traffic to instances, and a separate set of rules that control the outbound traffic. Security groups can be stateful, in that return traffic is automatically allowed.

A customer can also set up network access control lists (ACLs) with rules similar to security groups in order to add an additional layer of security to an IVN. Network ACLs operate at the subnet level, support allow rules and deny rules, and automatically apply to all instances in any subnet with which it is associated. Network ACLs may not be stateful, in that return traffic must be explicitly allowed by the rules. The same security group may be used or replicated for multiple compute instances. A VCS client may use security groups alone if desired without using network ACLs, use network ACLs without using security groups, or use both security groups and network ACLs. In some embodiments in which multiple security rules (security groups and/or network ACLs) are configured for a given set of VCS resources, the VCS client may provide an indication of the order in which the different rules should be applied, in effect indicating the relative priority of the rules.

After the security groups and/or network ACLs are specified for a compute instance's traffic and/or for mid-haul or front-haul traffic, the VCS control plane servers may be responsible for ensuring that the rules are enforced. For example, the control plane servers may cause networking components of the VCS (such as networking components of virtualization managers/hypervisors, routers and other networking devices) to verify, prior to delivering any packets or messages to the applicable compute instance or NFA, that the rules pertaining to inbound traffic would not be violated by the delivery. Packets whose delivery would violate the rules may be dropped in some implementations. Similarly, for outbound packets/messages, the VCS networking components may ensure before forwarding the packets along a path to the intended destination, that the outbound traffic security rules are not being violated. The rules may be propagated from the VCS control plane servers to the relevant VCS networking management components in various embodiments.

According to some embodiments, VCS clients may specify routing entries for various sets of sources and destinations in IVNs via programmatic interfaces, and such routing entries may be stored in route tables 1228 maintained as part of the IVN metadata in the depicted embodiment. Clients may define one or more subnets 1230 in some embodiments within an IVN, and use compute instances configured within the different subnets for respective applications if desired.

One or more NFA mid-haul traffic addresses 1242 and/or front-haul traffic addresses 1262 may be assigned by the VCS control plane servers and stored as part of the IVN metadata in some embodiments. The addresses used for mid-haul traffic and/or front-haul traffic may be selected from the same range of IVN addresses from which VNI/IP addresses are chosen in some embodiments; in other embodiments, a different range of addresses (or even addresses of a different protocol than IP) may be used for front-haul and/or mid-haul traffic. Security groups 1244 and 1264, analogous to security groups 1224 but applicable specifically to mid-haul and front-haul traffic respectively may be defined/specified by VCS clients in the depicted embodiment. Similarly, network ACLs 1246 and/or 1266 may be specified/defined by VCS clients for mid-haul and front-haul traffic, and route tables 1248 may be populated with entries specified by the VCS clients for mid-haul traffic in at least some embodiments. In various embodiments, the VCS control plane may implement respective programmatic interfaces that can be used by VCS clients to specify the various configuration settings shown in FIG. 12, and the control plane servers may cause the specified settings to be enforced or applied in response to requests received via such interfaces.

Figure 13:
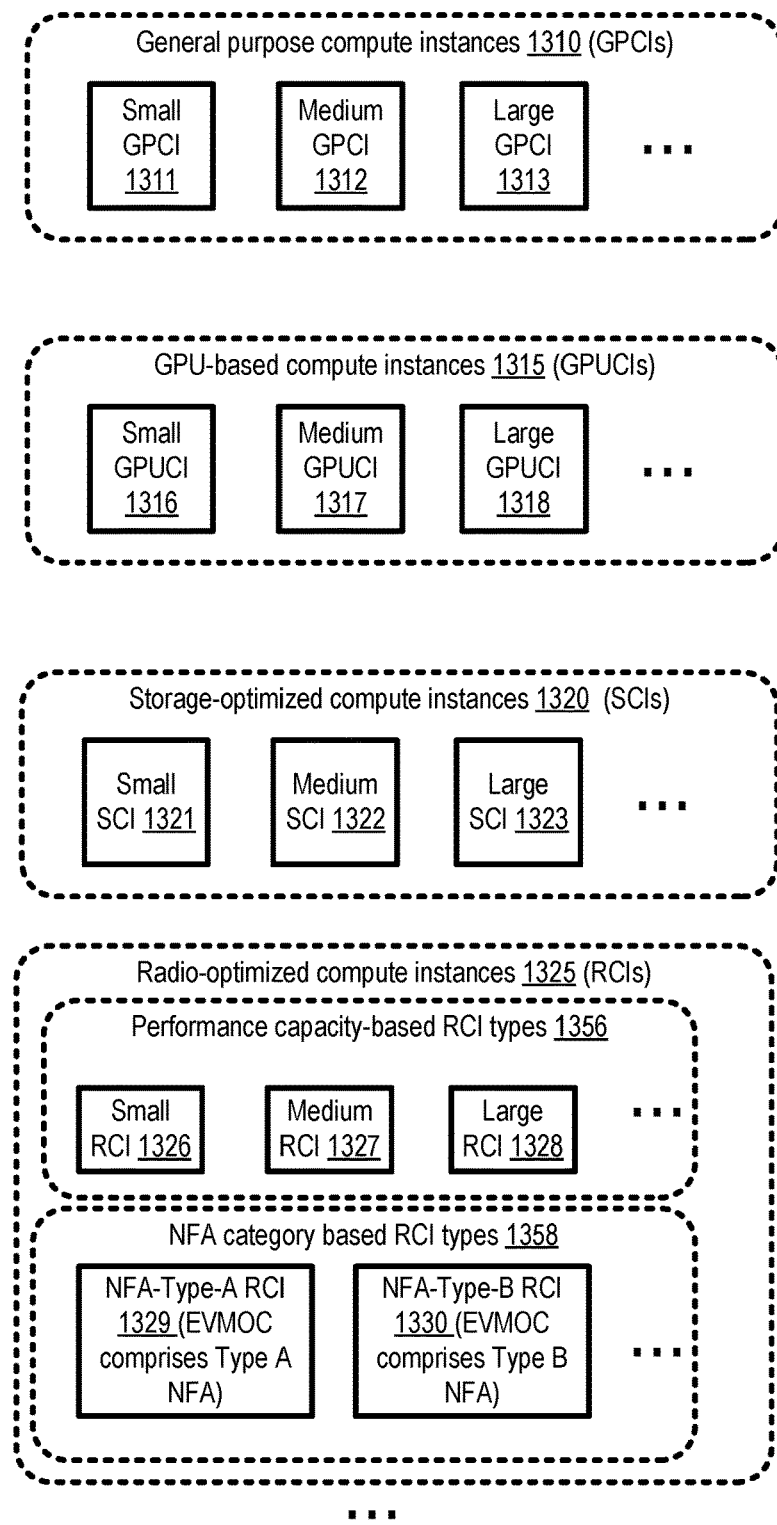
FIG. 13 illustrates example categories of compute instances that may be configured on behalf of clients of a virtualized computing service, according to at least some embodiments.

In some embodiments, a provider network may allow clients to launch compute instances selected from several different categories arranged in instance families. FIG. 13 illustrates example categories of compute instances that may be configured on behalf of clients of a virtualized computing service, according to at least some embodiments. The supported instance families in the depicted embodiment include general purpose compute instances 1310, GPU-based compute instances 1315, storage-optimized compute instances 1320, and radio-optimized compute instances 1325. Families (other than the general purpose family) may be optimized in some way for respective types of applications; for example, applications which demand large amounts of fast persistent writes or reads may be best suited for storage-optimized compute instances 1320, applications which include substantial graphics-related tasks or certain types of machine learning workloads may be best suited for GPU-based compute instances 1315, and radio-based applications may benefit most from being run at radio-optimized compute instances 1325.

Some of the instance families in turn may include several instance categories, distinguished from one another based on properties such as performance capabilities. Small GPCIs 1311 of the general purpose compute instances 1310 may for example have fewer virtual CPUs and a smaller amount of memory available than medium GPCIs 1312, which in turn may have fewer virtual CPUs and a smaller amount of memory available than large GPCIs 1313. Similarly, small GPUCIs 1316 of the GPU-based family may have fewer virtualized GPUs available for client applications than medium GPUCIs 1317, and large GPUCIs 1318 may have more virtual GPUs available than medium GPUCIs. More and/or faster persistent storage devices may be accessible from large SCIs 1323 of storage-optimized compute instances 1320 than from medium SCIs 1322, and small SCIs 1321 may have less storage capacity or slower speed storage than medium SCIs.

The radio-optimized compute instances (RCIs) 1325 may be divided into categories based not just on performance differences in some embodiments, but also based on the types of NFAs accessible from the RCIs. Among performance capacity-based RCI types 1356, small RCIs 1326 may be capable of executing network functions at a slower aggregate rate (and may also have fewer vCPUs and smaller memory) than medium RCIs 1327, which may in turn be capable of executing network functions at a slower aggregate rate (and may also have fewer vCPUs and smaller memory) than large RCIs 1328. Some RCI categories may be defined based on the types of NFAs of the EVMOCs accessible from the RCIs in the depicted embodiment. NFA category-based RCI types 1358 may include, for example, an NFA-Type-A RCI 1329 which can be configured at virtualization servers whose EVMOCs include a Type A NFA, an NFA-Type-B RCI 1330 which can be configured at virtualization servers whose EVMOCs include a Type B NFA, and so on. RCIs may also be grouped into categories using a combination of the accelerator types available and performance capabilities in some embodiments—e.g., RCI categories "Small NFA-Type-A", "Large NFA-Type-A" etc. may be defined by the provider network. In at least one embodiment, the maximum number of NFAs that can be utilized for a radio-based application implemented with the help of an RCI may be determined based on the category of the RCI. For example, assume that an RPS's EVMOC has 16 NFAs. It may be the case in some implementations that only up to 4 of the 16 NFAs may be utilized from a "Small" RCI, only up to 8 of the 16 NFAs may be utilized from a "Medium" RCI, and so on.

Figure 14:
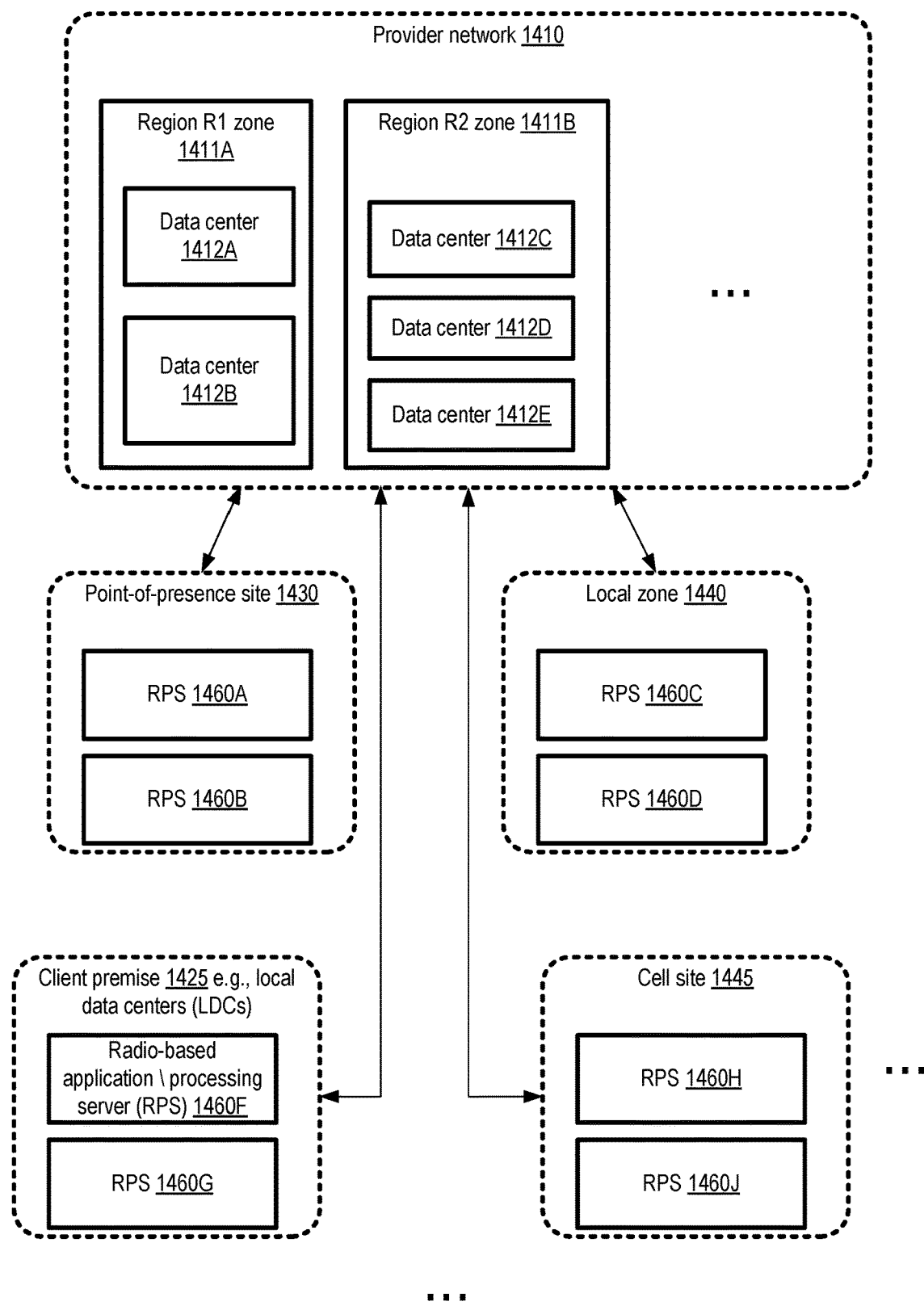
FIG. 14 illustrates example premises and sites at which radio-based application processing servers may be deployed, according to at least some embodiments.

FIG. 14 illustrates example premises and sites at which radio-based application processing servers may be deployed, according to at least some embodiments. In the embodiment depicted in FIG. 14, resources of a provider network 1410 may be organized into regional zones, such as region R1 zone 1411A and region R2 zone 1411B. A given regional zone may in turn comprise one or more data centers located relatively close to each other (e.g., within the same state or metropolitan area). Region R1 zone 1411A comprises data centers 1412A and 1412B, while region R2 zone 1411B comprises data centers 1412C, 1412D and 1412E in the example shown in FIG. 14. Each such data center 1412 may comprise control plane servers and data plane resources and artifacts of one or more services such as a virtualized computing service (VCS) similar to VCS 110 of FIG. 1 and/or a radio-based application management service (RBAMS).

RPSs of the kind described above may be configured, in response to programmatic requests from clients, at a variety of facilities other than the provider network's own data centers 1412 in the depicted embodiment. Such facilities may include, among others, cell sites 1445, client premises 1425 such as local data centers, local zones 1440, and/or point-of-presence sites 1430 in different embodiments. As shown, RPSs 1460A and 1460B may be set up, e.g., within a single rack, at point-of-presence site 1430. RPSs 1460C and 1460D may be set up at local zone 1440, RPSs 1460F and 1460G may be set up at a client-owned premise 1425, and RPSs 1460H and 1460J may be set up at a cell site (e.g., a room or group of rooms located next to cell towers with antennas). Other types of facilities and locations may be used for RPSs in some embodiments, instead or in addition to those shown in FIG. 14. From each RPS at a given facility, connectivity may be established with the control plane servers of the provider network in various embodiments, and with radio units (RUs) typically located very near or in the facilities. After such connectivity has been verified, in various embodiments software components such as isolated request handlers and L2Ps may be launched at the RPS to process radio-based application workloads as described earlier.

Figure 15:
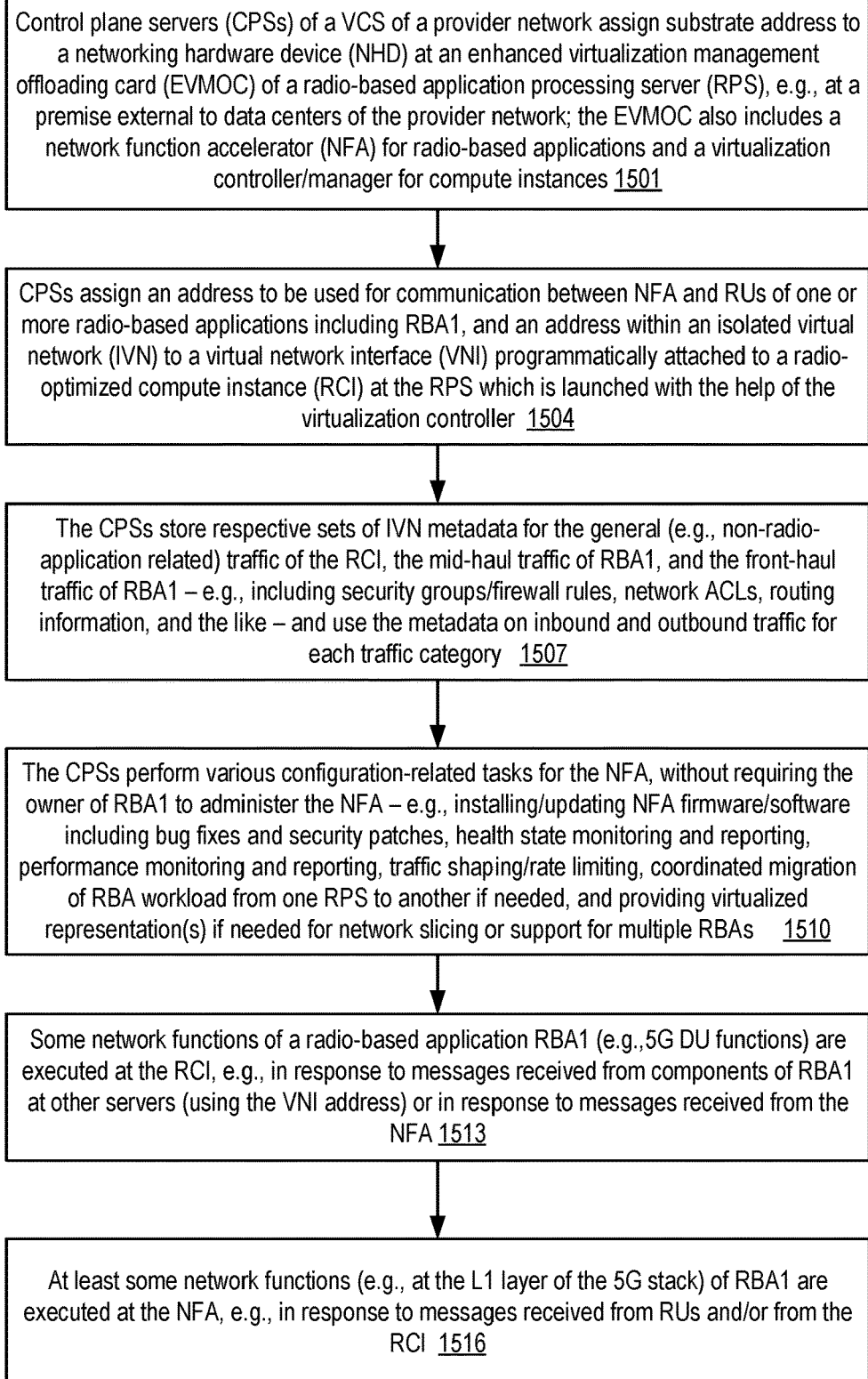
FIG. 15 is a flow diagram illustrating aspects of operations that may be performed to manage radio-based applications which include network functions executed at accelerators incorporated within virtualization management offloading cards, according to at least some embodiments.

FIG. 15 is a flow diagram illustrating aspects of operations that may be performed to manage radio-based applications which include network functions executed at accelerators incorporated within virtualization management offloading cards, according to at least some embodiments. As shown in element 1501, one or more control plane servers (CPSs) of a virtualized computing service (VCS) or a radio-based application management service (RBAMS) of a cloud provider network may assign a network address (e.g., an IP version 4 or IP version 6 address) that is part of a substrate or physical network of the VCS to a networking hardware device (NHD) incorporated within an enhanced virtualization management offloading card (EVMOC) of a radio-based application processing server (RPS) which is also a virtualization server of the VCS. The RPS may be located in a premise external to the data centers of the VCS at which the CPSs are located in at least some embodiments, e.g., to enable some of the operations of RBAs to be performed closer to the antennas or end-user devices of the RBAs and thereby support low latencies for such operations. The EVMOC may also include a network function accelerator (NFA), implemented for example using one or more special purpose chipsets that are optimized to execute network functions at one or more layers of a radio-based technology stack, including for example functions at the Distributed Unit (DU) layer of the 5G RAN stack. The EVMOC may also comprise one or more virtualization management components used for launching and administering one or more compute instances or virtual machines at the virtualization server, including a virtualization controller (which may, among other tasks, allocate a portion of memory of the virtualization server for each compute instance, and launch hypervisor components that run on the primary processors of the virtualization server instead of at the offloading card), a network processing offloader, and so on. Executing a subset of virtualization management tasks at the offloading cards may enable more of the primary processors and memory of the virtualization to be used for compute instances. A similar benefit may be achieved by offloading some of the network functions of one or more RBAs to the NFA, instead of using the primary processors of the virtualization server for the network functions; furthermore, in at least some embodiments, the optimized circuitry of the NFA may be able to perform the network function computations faster than if the primary processors were used.

The CPSs may assign an address (different from the substrate network address) to be used for communication between the NFA and one or more radio units (RUs) of one or more RAN nodes of an RBA RBA1 in the depicted embodiment (element 1504). Further, in at least one embodiment, the CPSs may assign, to a virtual network interface (VNI) which is programmatically attached to a radio-optimized compute instance (RCI) run at the RPS, an address within an isolated virtual network (IVN) set up for a VCS client on whose behalf at least some network functions of RBA1 are going to be run. The RCI may be launched, for example, using the virtualization controller and other virtualization management components of the RPS.

In various embodiments, the CPSs may store configuration settings pertaining to the IVN and the RCI, e.g., in response to various programmatic requests from the VCS client. Respective sets of such IVN configuration metadata may be stored for various categories of traffic: e.g., for the general purpose traffic (e.g., network packets that are not being transmitted as part of RBA1) of the RCI, the front-haul traffic of RBA1 and the mid-haul traffic of RBA1 in the depicted embodiment (element 1507), in effect giving the VCS client similar types of configuration control for NFA traffic that is provided for RCI traffic. A given set of the IVN configuration settings may include, for example, a security group (a set of firewall rules for inbound and outbound traffic with respect to the VNI/RCI and/or the NFA), network access control lists, traffic rate limits to be applied for inbound and/or outbound traffic, route table entries and/or other routing information to be used for the traffic of the RCI and/or the NFA, and so on. The CPSs may cause the security-related rules and rate limits to be enforced at the appropriate components of the system in various embodiments (such as the virtualization management components running at the RPS, networking intermediary devices such as VCS routers, and so on). For example, before individual packets are delivered to/from the RCI or the NFA, the VCS networking infrastructure may ensure that delivery of the packets would not violate an applicable security rule and would not result in violation of an applicable traffic rate limit.

The CPSs may automatically perform a number of other configuration-related tasks pertaining to RBAs such as RBA1 in the depicted embodiment (element 1510), without requiring the ongoing participation of the VCS client. For example, the CPSs may be responsible for causing firmware/software to be installed/updated at the NFAs, including bug fixes and security patches. The CPSs may monitor the health state of the NFAs and the RCI, and provide indications of the health status via programmatic interfaces to the VCS client in various embodiments. In at least some embodiments, the CPSs may also monitor performance metrics from the NFAs and the RCI, and also provide representations of the performance metrics to the VCS client via programmatic interfaces. Graphical interfaces or dashboards may be implemented or utilized by the VCS control plane to present such information. In at least one embodiment, based at least in part on analysis of collected metrics (such as performance metrics or health state metrics), and/or based on migration requests submitted programmatically by the VCS client, a decision to migrate at least a portion of RBA1's workload to another RPS may be made. The CPSs may orchestrate the migration procedure, which may require replication of state information from the RCI, as well as state information of front-haul and/or mid-haul traffic (part of which may be obtained from the NFA) at the migration destination as discussed earlier. Respective virtualized representations of the NFA may be provided to multiple RCIs run at the RPS in some embodiments, enabling several RBAs or RBA pipelines to be executed in parallel while sharing access to the NFA.

In various embodiments, respective portions of the logic of RBA1 may be executed at an RCI and the NFA. For example, in the downlink direction flow of RBA1 operations, some network functions of RBA1's DU may be run at the RCI in response to messages received via the address assigned to the RCI's VNI from other components of RBA1 running at other servers (element 1513). Using the results or output of such network functions, additional network functions lower down in the radio-base technology stack, such as various physical layer or L1 functions, may be run at the NFA (element 1516), and results of these network functions may be transmitted from the NFA to one or more RUs using the address assigned to the NFA for front-haul communications. Traffic may also flow in the uplink direction, e.g., from end user devices via RUs to the NFA (where some network functions may be executed) and from the NFA to the RCI (where other network functions may be executed) in various embodiments, with the results of the RCI-executed network functions potentially being transmitted to destinations external to the RPS. It is noted that in various embodiments, some of the operations shown in the flow chart of FIG. 16 may be implemented in a different order than that shown in the figure, or may be performed in parallel rather than sequentially. Additionally, some of the operations shown in FIG. 16 may not be required in one or more implementations.

Figure 16:
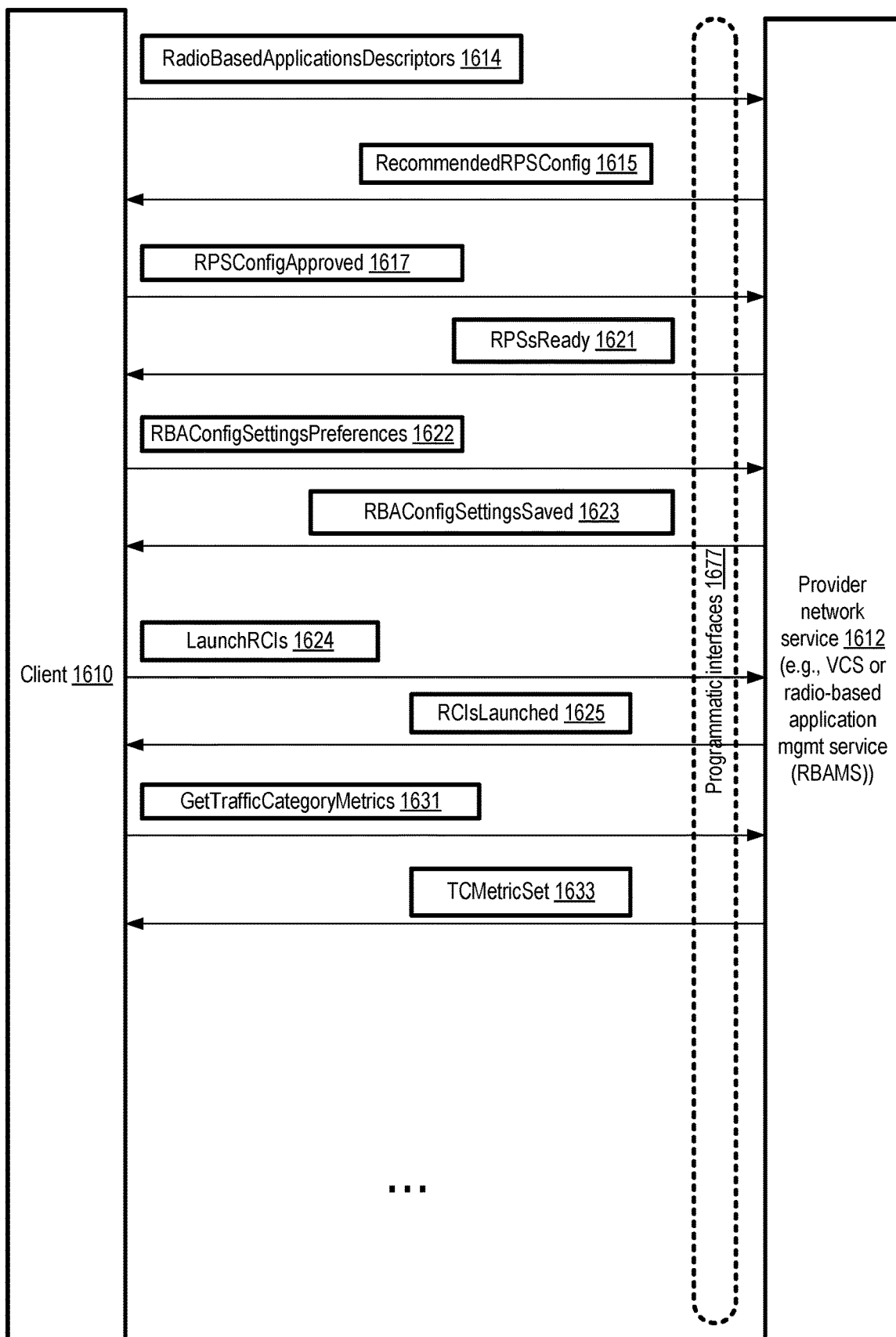
FIG. 16 illustrates example programmatic interactions, pertaining to radio-based applications, between clients and a provider network service, according to at least some embodiments.

FIG. 16 illustrates example programmatic interactions, pertaining to radio-based applications, between clients and a provider network service, according to at least some embodiments. In the depicted embodiment, a provider network service 1612 (such as a VCS or a radio-based application management service (RBAMS)) may implement a set of programmatic interfaces 1677, such as web-based consoles, command-line tools, graphical user interfaces, APIs and the like, which can be utilized by service clients to submit messages or requests to the service and receive corresponding responses.

A client 1610 may use programmatic interfaces 1677 to send a RadioBasedApplicationsDescriptor message 1614 to the service 1612, indicating a set of locations of cells near which RPSs may be required, the workloads expected at the locations (e.g., how many end user devices for the client's radio-based applications such as public networks or private 5G networks are expected to be utilized at each location, what the approximate expected message rates from the end users are at various times of the day or days of the week, etc.), the quality of service (e.g., message latencies for different kinds of traffic) desired for the RBA, and the like. The RadioBasedApplicationsDescriptor message 1614 may also include the client's preferences about single-tenancy (e.g., whether the client wants exclusive use of an RPS and/or exclusive use of the NFAs of such cards) versus multi-tenancy (e.g., that the client is willing to share RPSs, and/or network function accelerators with other clients), whether the client requires a particular vendor's NFAs or is willing to use any of several vendors, and so on. The information provided by the client may be analyzed at the provider network, e.g., by a configuration manager at a control plane server of a VCS, and a recommendation of an RPS configuration that can be used to satisfy the estimated requirements of the client's applications may be prepared. The recommendation, which may for example indicate the count and types of RPSs proposed for each of one or more specific locations (point-of-presence sites, client-owned premises, cell towers etc.), may be provided to the client in one or more RecommendedRPSConfig messages 1615 in the depicted embodiment. Note that in some cases, some of the locations indicated in the recommendations may already have one or more RPSs installed and configured, e.g., for other clients who have previously submitted information about their own radio-based application workloads.

If the client approves the recommendations, an RPSConfigApproved message 1617 may be sent via interfaces 1677 to the service 1612. If new RPSs have to be transported to and installed at the approved recommended sites, the process for doing so may be initiated by the provider network operator (note that this process may take some time, e.g., several days in some cases). In some embodiments, additional RPSs may be added to a pre-installed set of RPSs (used for other clients, or currently unused but set up in anticipation of client requirements) at one or more of the recommended sites to accommodate the additional workload indicated by the client. When the RPSs that are to be used for the client (configured in multi-tenant mode, or in single-tenant mode, depending on the client's preferences or on default settings of the service 1612 if the client does not indicate a tenancy preference) have been identified, and after connectivity between the RPSs and the control plane resources of the provider network has been verified, an RPSsReady message 1621 may be sent to the client in some embodiments to indicate that the client can request the launch of compute instances for their radio-based applications. In some embodiments, respective identifiers of the RPSs designated for the client's use may be provided in an RPSsReady message, and such identifiers can be used by the client to request launches of radio-optimized compute instances at individual RPSs. In some embodiments, before the client's radio-optimized compute instances are launched, the service 1612 may also verify that connectivity has also been established between the RPSs designated for the client's use and (a) the RUs (radio units) at the cells which are to be used for the client's applications as well as (b) the resources to be used for centralized units (CUs) and/or other layers of the applications' stacks. In other embodiments, such verification of connectivity to RUs and/or CUs may be performed after the compute instances are launched.

In the embodiment depicted in FIG. 16, a client 1610 may utilize programmatic interfaces 1677 to indicate preferences regarding various aspects of the configuration of components of an RBA to be run using an RPS, including for example information about the IVN within which an RCI is to be launched (which may have been created earlier in response to programmatic requests from the client), preferred addresses or address ranges for various components such as the RCI's VNI or the NFA, security rules for various categories of traffic of the RBA, traffic rate limits, and so on. Such preferences may be indicated in one or more RBAConfigSettingsPreferences messages 1622 to the service 1612. The preferences indicated by the client may be stored at a repository of the service, and an RBAConfigSettingsSaved message 1623 may be sent to the client.

A client 1610 may submit one or more LaunchRCIs requests 1624 via the programmatic interfaces 1677 in various embodiments, indicating for example the sites/premises, ERGs, or the specific RPSs at which one or more RCIs of a specified category (such as the RCI types shown in FIG. 13) are to be instantiated for the client's applications. An RCIsLaunched message 1625 may be sent to the client 1610 in some embodiments, confirming that the RCIs have been launched. In some embodiments, configuration information about the launched RCIs may be provided to the client, such as instance identifiers, IP addresses etc. (which can be used to communicate with CUs, RUs and/or core network resources of the client's applications).

In at least one embodiment, a client may submit a GetTrafficCategoryMetrics request 1631 to the service 1612, requesting metrics collected for one or more of the traffic categories indicated in FIG. 11 at one or more RPSs. The requested set of metrics may be provided to the client via one or more TCMetricSet messages 1633 in the depicted embodiment. For example, a client may obtain metrics of front-haul traffic alone such as how many messages were transmitted to and from RUs during a time interval, the total amount of data transferred to and from RUs, the latencies for such messages, whether any messages were lost and so on. Similar sets of metrics may be provided for mid-haul traffic, intra-IVN traffic, and so on. In some implementations, the metrics may be further broken down by NHD—e.g., separate sets of metrics for a given category of traffic which is transmitted via two NHDs of an RPS may be provided for each NHD if desired. Other types of programmatic interactions pertaining to implementation of radio-based applications using provider network resources may be supported in some embodiments than those shown in FIG. 16.

Figure 17:
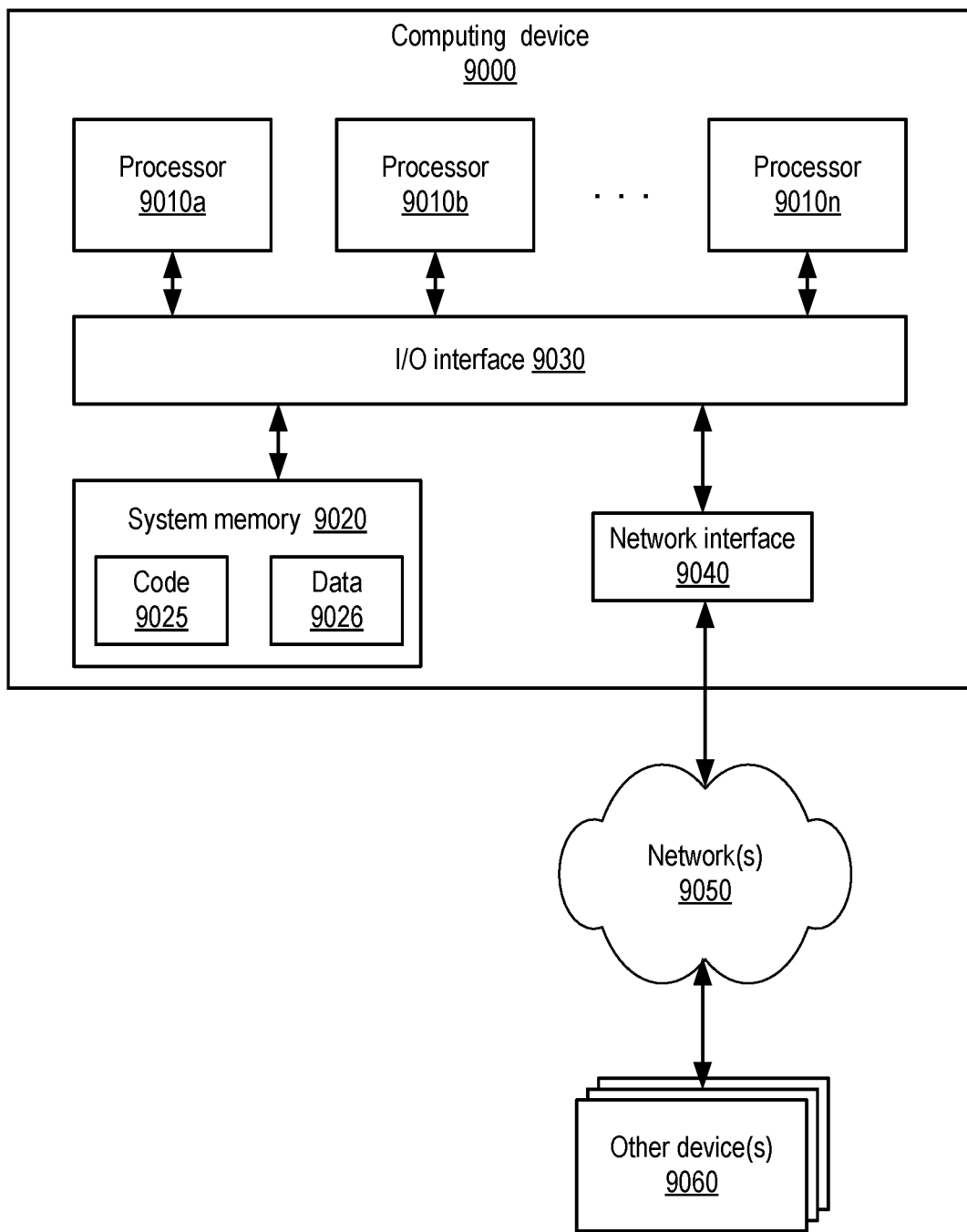
FIG. 17 is a block diagram illustrating an example computing device that may be used in at least some embodiments.

In at least some embodiments, a server that implements the types of techniques described herein (e.g., various functions of a provider network service such as a VCS, including functions within the provider network service as well as at extension sites), may include a general-purpose computer system that includes or is configured to access one or more computer-accessible media. FIG. 17 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 16, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 16. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 17 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a control plane server of a virtualized computing service of a cloud provider network; and
a virtualization server which includes a network function accelerator for radio-based applications;
wherein the control plane server is configured to:
establish an isolated virtual network on behalf of a client of the virtualized computing service;
store, within a repository of metadata of the isolated virtual network in response to a first request submitted via a programmatic interface of the virtualized computing service by the client, a representation of a first security group associated with a compute instance launched at the virtualization server, wherein the compute instance is assigned a network address within the isolated virtual network, wherein the first security group includes a first restriction on sources of inbound traffic directed to the compute instance, and wherein the compute instance executes a first network function of a radio-based application;
store, within the repository in response to a second request submitted via the programmatic interface by the client, a representation of a second security group associated with the network function accelerator, wherein the second security group includes a second restriction on destinations of outbound traffic from the network function accelerator, and wherein the network function accelerator executes a second network function of the radio-based application;
cause a verification, prior to delivery of a first network message of the radio-based application to the compute instance using the network address as a destination address, that the first network message is compliant with the first restriction, wherein the first network message results at least in part in an execution of the first network function; and
cause a verification, prior to transmission of a second network message of the radio-based application to a destination from the network function accelerator, that the second network message is compliant with the second restriction, wherein output of an execution of the first network function results at least in part in an execution of the second network function.

2. The system as recited in claim 1, wherein the control plane server is further configured to:
cause a third network message originating at the network function accelerator to not be transmitted to the destination in response to determining that transmission of the third network message would violate a rate limit associated with traffic to or from the network function accelerator.

3. The system as recited in claim 1, wherein the virtualization server comprises an offloading card, wherein the offloading card includes the network function accelerator and a virtualization controller, wherein the control plane server is further configured to:
launch, in response to another request, the compute instance using the virtualization controller.

4. The system as recited in claim 1, wherein the control plane server is further configured to:
store, in response to another request, a route table entry for mid-haul traffic of the radio-based application within a route table of the isolated virtual network, wherein the mid-haul traffic comprises a message generated at a distributed unit (DU) of the radio-based application and directed to a centralized unit (CU) of the radio-based application, wherein the message is generated at the virtualization server.

5. The system as recited in claim 1, wherein the control plane server is further configured to:
assign a network address from a range of network addresses of the isolated virtual network to the network function accelerator.

6. A computer-implemented method, comprising:
storing, in response to a first programmatic request, a representation of a first collection of configuration settings of a compute instance launched at a virtualization server and configured within an isolated virtual network, wherein the compute instance implements a first network function of a radio-based application, wherein the virtualization server includes a network function accelerator for radio-based applications, and wherein the first collection of configuration settings includes a first network security rule set to be applied to traffic of the compute instance;
storing, in response to a second programmatic request, a representation of a second collection of configuration settings of the network function accelerator, wherein the second collection of configuration settings includes a second network security rule set to be applied to traffic of the network function accelerator;
verifying, prior to delivering a first network message to the compute instance, that the first network message is compliant with the first network security rule set, wherein delivery of the first network message to the compute instance results in execution of the first network function at the compute instance; and
verifying, prior to transmitting a second network message from the network function accelerator to a destination external to the virtualization server, that the second network message is compliant with the second network security rule set, wherein the second network message comprises output of a second network function which is executed at the network function accelerator.

7. The computer-implemented method as recited in claim 6, wherein the virtualization server comprises an offloading card, wherein the offloading card includes the network function accelerator and a virtualization controller, the computer-implemented method further comprising:
launching, in response to another programmatic request, the compute instance using the virtualization controller.

8. The computer-implemented method as recited in claim 6, further comprising:
storing, in response to another programmatic request, a route table entry for mid-haul traffic of the radio-based application within a route table of the isolated virtual network, wherein the mid-haul traffic comprises a message generated at a distributed unit (DU) of the radio-based application and directed to a centralized unit (CU) of the radio-based application, and wherein the message is generated at the virtualization server.

9. The computer-implemented method as recited in claim 6, wherein the second network security rule set is applied to traffic between the network function accelerator and a radio unit of the radio-based application, the computer-implemented method further comprising:
storing, in response to another programmatic request, a third network security rule set to be applied to traffic between the network function accelerator and a centralized unit of the radio-based application.

10. The computer-implemented method as recited in claim 6, further comprising:
assigning to the network function accelerator, in response to another programmatic request, a network address from a range of network addresses of the isolated virtual network.

11. The computer-implemented method as recited in claim 6, wherein the second network security rule set includes a network access control list to be applied to at least a portion of traffic of the network function accelerator, wherein the network access control list applies to a subnet defined within the isolated virtual network.

12. The computer-implemented method as recited in claim 6, wherein the first network message is formatted in accordance with the Internet Protocol (IP), and wherein the second network message is formatted in accordance with the Common Public Radio Interface (CPRI) or the enhanced Common Public Radio Interface (eCPRI).

13. The computer-implemented method as recited in claim 6, wherein the second network function comprises an L1 network function of a radio-based technology stack.

14. The computer-implemented method as recited in claim 6, wherein the first network function comprises a network function of a distributed unit (DU) of a radio-based technology stack.

15. The computer-implemented method as recited in claim 6, wherein the virtualization server is part of a virtualized computing service, wherein the virtualization server comprises an offloading card that includes the network function accelerator and a networking hardware device, the computer-implemented method further comprising:
assigning (a) a first network address of a substrate network of the virtualized computing service to the networking hardware device and (b) a second network address to the compute instance, wherein the second network address is not part of the substrate network, wherein the first network message originates at a source external to the virtualization server, the first network passage is addressed to the second network address of the compute instance, and first network passage is delivered to the compute instance using a mapping between the first network address and the second network address.

16. A non-transitory computer-accessible storage medium storing program instructions that when executed on a processor implement a control plane server of a virtualized computing service, wherein the control plane server is configured to:
store, in response to a first programmatic request, a representation of a first collection of configuration settings of a compute instance launched at a virtualization server and configured within an isolated virtual network, wherein the compute instance implements a first network function of a radio-based application, wherein the virtualization server includes a network function accelerator for radio-based applications, and wherein the first collection of configuration settings includes a first network security rule set to be applied to traffic of the compute instance;
store, in response to a second programmatic request, a representation of a second collection of configuration settings of the network function accelerator, wherein the second collection of configuration settings includes a second network security rule set to be applied to traffic of the network function accelerator;
cause to be verified, prior to delivery of a first network message to the compute instance, that the first network message is compliant with the first network security rule set, wherein delivery of the first message to the compute instance results in execution of the first network function at the compute instance; and
cause to be verified, prior to transmitting a second network message from the network function accelerator to a destination external to the virtualization server, that the second network message is compliant with the second network security rule set, wherein the second network message comprises output of an execution of a second network function.

17. The non-transitory computer-accessible storage medium as recited in claim 16, wherein the virtualization server comprises an offloading card, wherein the offloading card includes the network function accelerator and a virtualization controller, wherein the control plane server is further configured to:
launch, in response to another programmatic request, the compute instance using the virtualization controller.

18. The non-transitory computer-accessible storage medium as recited in claim 16, wherein the control plane server is further configured to:
store, in response to another programmatic request, a route table entry for mid-haul traffic of the radio-based application within a route table of the isolated virtual network, wherein the mid-haul traffic comprises a message generated at a distributed unit (DU) of the radio-based application and directed to a centralized unit (CU) of the radio-based application, wherein the message is generated at the virtualization server.

19. The non-transitory computer-accessible storage medium as recited in claim 16, wherein the second network security rule set is to be applied to traffic between the network function accelerator and a radio unit of the radio-based application, and wherein the control plane server is further configured to:
store, in response to another programmatic request, a third network security rule set to be applied to traffic between the network function accelerator and a centralized unit of the radio-based application.

20. The non-transitory computer-accessible storage medium as recited in claim 16, wherein the control plane server is further configured to:
assign to the network function accelerator, in response to another programmatic request, a network address from a range of network addresses of the isolated virtual network.

* * * * *